(12) United States Patent
Iwamoto et al.

(10) Patent No.: US 8,632,887 B2
(45) Date of Patent: Jan. 21, 2014

(54) INTERLAYER FOR LAMINATED GLASS, AND LAMINATED GLASS

(75) Inventors: Tatsuya Iwamoto, Kouka (JP); Kohei Kani, Kouka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 13/514,933

(22) PCT Filed: Dec. 28, 2010

(86) PCT No.: PCT/JP2010/073742
§ 371 (c)(1),
(2), (4) Date: Jun. 8, 2012

(87) PCT Pub. No.: WO2011/081191
PCT Pub. Date: Jul. 7, 2011

(65) Prior Publication Data
US 2012/0244364 A1    Sep. 27, 2012

(30) Foreign Application Priority Data

Dec. 28, 2009  (JP) .................................. 2009-297512
Sep. 10, 2010  (JP) .................................. 2010-202840

(51) Int. Cl.
*B32B 17/10*    (2006.01)
*B32B 27/30*    (2006.01)
*B32B 27/42*    (2006.01)

(52) U.S. Cl.
USPC ............ 428/436; 428/437; 428/524; 428/525

(58) Field of Classification Search
USPC .................... 428/436, 437, 524, 525
See application file for complete search history.

(56) References Cited

U.S. PATENT DOCUMENTS

| 2003/0139520 | A1 | 7/2003 | Toyama et al. |
| 2013/0202863 | A1 | 8/2013 | Shimamoto et al. |

FOREIGN PATENT DOCUMENTS

| JP | 1-252556 A | 10/1989 |
| JP | 3-124441 A | 5/1991 |
| JP | 9-40444 A | 2/1997 |
| JP | 10-36146 A | 2/1998 |
| JP | 10-316454 A | 12/1998 |
| JP | 11-255827 A | 9/1999 |
| JP | 2001-316140 A | 11/2001 |
| JP | 2003-252655 A | 9/2003 |
| JP | 2007-70200 A | 3/2007 |

OTHER PUBLICATIONS

International Search Report for the Application No. PCT/JP2010/073742 mailed Feb. 22, 2011.
International Preliminary Report on Patentability for Application No. PCT/JP2010/073742 mailed Aug. 23, 2012.
Non-Final Office Action for U.S. Appl. No. 13/514,013 from USPTO mailed Sep. 23, 2013.

*Primary Examiner* — D. S. Nakarani
(74) *Attorney, Agent, or Firm* — Cheng Law Group, PLLC

(57) ABSTRACT

The present invention provides an interlayer film for a laminated glass which can suppress bubble formation and bubble growth in the laminated glass. An interlayer film 1 for a laminated glass includes a first layer 2 and a second layer 3 laminated on one face 2a of the first layer 2. Each of the first layer 2 and the second layer 3 contains a polyvinyl acetal resin and a plasticizer. In the case of measuring viscoelasticity of a resin film (glass transition temperature: Tg (° C.)) formed from the first layer 2 or a resin film (glass transition temperature: Tg (° C.)) formed with 100 parts by weight of the polyvinyl acetal resin contained in the first layer 2 and 60 parts by weight of a plasticizer of triethylene glycol di-2-ethylhexanoate (3GO), the resin film has an elastic modulus of G'(Tg+80) at (Tg+80)° C. and an elastic modulus of G'(Tg+30) at (Tg+30)° C., and provides a ratio (G'(Tg+80)/G'(Tg+30)) of 0.65 or higher.

19 Claims, 2 Drawing Sheets

INTERLAYER FOR LAMINATED GLASS, AND LAMINATED GLASS

TECHNICAL FIELD

The present invention relates to an interlayer film for a laminated glass that has a multi-layer structure including at least two layers. More specifically, the present invention relates to an interlayer film for a laminated glass, each layer of which contains a polyvinyl acetal resin and a plasticizer; and a laminated glass including the interlayer film for a laminated glass.

BACKGROUND ART

A laminated glass is a safety glass which, even when broken by impact from the outside, shatters into few flying glass fragments. For this reason, a laminated glass is widely used for cars, rail cars, aircrafts, boats and ships, buildings, and the like. The laminated glass is produced by sandwiching an interlayer film for a laminated glass between a pair of glass plates.

Patent Document 1 provides one example of the interlayer film for a laminated glass; that is, Patent Document 1 teaches a sound insulation layer that contains 100 parts by weight of a polyvinyl acetal resin having a degree of acetalization of 60 to 85 mol %, 0.001 to 1.0 part by weight of at least one metal salt of an alkali metal salt and an alkaline earth metal salt, and 30 parts by weight or more of a plasticizer. This sound insulation layer alone can be used as an interlayer film.

Patent Document 1 also teaches a laminated interlayer film in which the sound insulation layer and other layers are laminated. Each of the other layers laminated on the sound insulation layer contains 100 parts by weight of a polyvinyl acetal resin having a degree of acetalization of 60 to 85 mol %, 0.001 to 1.0 part by weight of at least one metal salt of an alkali metal salt and an alkaline earth metal salt, and 30 parts by weight or less of a plasticizer.

Patent Document 1: JP 2007-070200 A

SUMMARY OF THE INVENTION

Problems to be Solved by the Invention

A laminated glass formed with use of the interlayer film of Patent Document 1 unfortunately has insufficient sound insulation for sound with a frequency of about 2000 Hz, and therefore tends to provide decreased sound insulation when the coincidence effect is observed. Also, the laminated glass sometimes provides insufficient sound insulation at around 20° C.

Here, the coincidence effect refers to a phenomenon in which, upon incidence of sound waves on a glass plate, traverse waves spread on the glass surface to resonate with the incidence sound, whereby the sound is transmitted.

In the case of forming a laminated glass with the laminated interlayer film in which a sound insulation layer and other layers are laminated according to Patent Document 1, the sound insulation at around 20° C. is increased to some extent. However, the laminated interlayer film, including the sound insulation layer, can cause bubble formation when used for a laminated glass.

Meanwhile, considerations have been made in recent years to increase the amount of the plasticizer in the interlayer film for an increase in the sound insulation of a laminated glass. Increasing the amount of the plasticizer can improve the sound insulation of the laminated glass. However, the increase in the amount of the plasticizer sometimes causes bubble formation in the laminated glass.

The present invention aims to provide an interlayer film for a laminated glass which can give a laminated glass capable of suppressing bubble formation and bubble growth; and a laminated glass using the interlayer film for a laminated glass.

Specifically, the present invention aims to provide an interlayer film for a laminated glass which can provide a laminated glass providing excellent sound insulation; and a laminated glass using the interlayer film for a laminated glass.

Means for Solving the Problems

A broad aspect of the present invention is an interlayer film for a laminated glass, including a first layer that contains a polyvinyl acetal resin and a plasticizer, and a second layer that contains a polyvinyl acetal resin and a plasticizer and is laminated on one face of the first layer, wherein in the case of measuring viscoelasticity of a resin film formed from the first layer, the resin film, having a glass transition temperature of Tg (° C.), has an elastic modulus of G'(Tg+80) at (Tg+80)° C. and an elastic modulus of G'(Tg+30) at (Tg+30)° C., and provides a ratio (G'(Tg+80)/G'(Tg+30)) of 0.65 or higher.

Another broad aspect of the present invention is an interlayer film for a laminated glass, including a first layer that contains a polyvinyl acetal resin and a plasticizer, and a second layer that contains a polyvinyl acetal resin and a plasticizer and is laminated on one face of the first layer, wherein in the case of measuring viscoelasticity of a resin film formed with 100 parts by weight of the polyvinyl acetal resin contained in the first layer and 60 parts by weight of a plasticizer of triethylene glycol di-2-ethylhexanoate (3GO), the resin film, having a glass transition temperature of Tg (° C.) has an elastic modulus of G'(Tg+80) at (Tg+80)° C. and an elastic modulus of G'(Tg+30) at (Tg+30)° C., and provides a ratio (G'(Tg+80)/G'(Tg+30)) of 0.65 or higher.

In a specific aspect of the interlayer film for a laminated glass according to the present invention, the elastic modulus G'(Tg+30) is 200,000 Pa or higher.

In another specific aspect of the interlayer film for a laminated glass according to the present invention, the polyvinyl acetal resin in the first layer has a degree of acetylation of 8 mol % or higher.

In a yet another specific aspect of the interlayer film for a laminated glass according to the present invention, the polyvinyl acetal resin in the first layer has a degree of acetylation of lower than 8 mol % and a degree of acetalization of 68 mol % or higher.

In a yet another specific aspect of the interlayer film for a laminated glass according to the present invention, the polyvinyl acetal resin in the first layer has a molecular-weight distribution (weight-average molecular weight Mw/number-average molecular weight Mn) of 6.5 or lower.

In a yet another specific aspect of the interlayer film for a laminated glass according to the present invention, the polyvinyl acetal resin in the first layer has a molecular-weight distribution (weight-average molecular weight Mw/number-average molecular weight Mn) of 2.5 to 3.2.

In a yet another specific aspect of the interlayer film for a laminated glass according to the present invention, the first layer has 50 parts by weight or more of the plasticizer for each 100 parts by weight of the polyvinyl acetal resin.

In a yet another specific aspect of the interlayer film for a laminated glass according to the present invention, the first layer has 55 parts by weight or more of the plasticizer for each 100 parts by weight of the polyvinyl acetal resin.

In a yet another specific aspect of the interlayer film for a laminated glass according to the present invention, the polyvinyl acetal resin in the first layer contains 30 mol % or lower of a hydroxyl group.

In a yet another specific aspect of the interlayer film for a laminated glass according to the present invention, the film further includes a third layer that contains a polyvinyl acetal resin and a plasticizer and is laminated on the other face of the first layer.

In a yet another specific aspect of the interlayer film for a laminated glass according to the present invention, when the third layer is used, the polyvinyl acetal resin in the first layer has a degree of acetylation of 8 mol % or higher.

In a yet another specific aspect of the interlayer film for a laminated glass according to the present invention, when the third layer is used, the polyvinyl acetal resin in the first layer has a degree of acetylation of lower than 8 mol % and a degree of acetalization of 68 mol % or higher.

In a yet another specific aspect of the interlayer film for a laminated glass according to the present invention, an amount of the plasticizer for each 100 parts by weight of the polyvinyl acetal resin in the first layer is larger than an amount of the plasticizer for each 100 parts by weight of the polyvinyl acetal resin in each of the second layer and the third layer.

The polyvinyl acetal resin in each of the first layer, the second layer and the third layer preferably includes a polyvinyl butyral resin. The plasticizer in each of the first layer, the second layer and the third layer preferably includes at least one compound selected from the group consisting of triethylene glycol di-2-ethylbutyrate, triethylene glycol di-2-ethylhexanoate, and triethylene glycol di-n-heptanoate.

In a yet another specific aspect of the interlayer film for a laminated glass according to the present invention, the polyvinyl acetal resin in the first layer of the interlayer film for a laminated glass includes a carboxylic acid-modified polyvinyl acetal resin.

In a yet another specific aspect of the interlayer film for a laminated glass according to the present invention, the first layer contains a compound that has a boron atom.

In a yet another specific aspect of the interlayer film for a laminated glass according to the present invention, the compound that has a boron atom includes at least one compound selected from the group consisting of sodium tetraborate, potassium tetraborate, and boric acid.

A laminated glass according to the present invention is a laminated glass that includes first laminated-glass component and second laminated-glass component, and an interlayer film sandwiched between the first laminated-glass component and the second laminated-glass component, wherein the interlayer film is the interlayer film for a laminated glass formed according to the present invention.

Effect of the Invention

The interlayer film for a laminated glass according to the present invention includes a first layer that contains a polyvinyl acetal resin and a plasticizer, and a second layer that contains a polyvinyl acetal resin and a plasticizer and is laminated on one face of the first layer, and provides a ratio (G'(Tg+80)/G'(Tg+30)) of 0.65 or higher. Accordingly, the interlayer film, when used for a laminated glass, can suppress bubble formation and bubble growth in the laminated glass.

In the case that the first layer contains 50 parts by weight or more of the plasticizer for each 100 parts by weight of the polyvinyl acetal resin, the sound insulation of the laminated glass can be sufficiently increased.

MODE(S) FOR CARRYING OUT THE INVENTION

Hereinafter, the present invention will be described by means of specific Embodiments and Examples of the present invention, with reference to the drawings.

Figure 1:
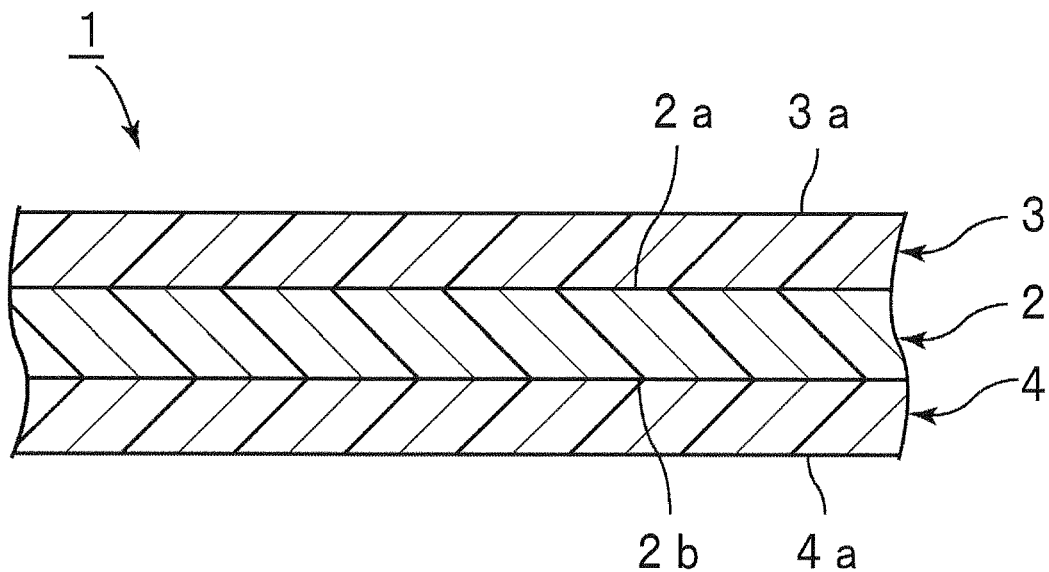
FIG. 1 is a cross-sectional view schematically illustrating an interlayer film for a laminated glass according to one embodiment of the present invention.

FIG. 1 is a cross-sectional view schematically illustrating an interlayer film for a laminated glass according to one embodiment of the present invention.

An interlayer film 1 illustrated in FIG. 1 is provided with a first layer 2, a second layer 3 laminated on one face 2a (first face) of the first layer 2, and a third layer 4 laminated on the other face 2b (second face) of the first layer 2. The interlayer film 1 is used for forming a laminated glass. The interlayer film 1 is an interlayer film for a laminated glass. The interlayer film 1 is a laminated interlayer film.

The first layer 2 is arranged between the second layer 3 and the third layer 4, that is, sandwiched between the second layer 3 and the third layer 4. In the present embodiment, the first layer 2 is an intermediate layer, and the second layer 3 and the third layer 4 are surface layers. Here, the second layer 3 and the third layer 4 may be intermediate layers, and an additional interlayer film for a laminated glass may be laminated on each of outer surface 3a of the second layer 3 and outer surface 4a of the third layer 4.

Each of the first layer 2, the second layer 3 and the third layer 4 preferably contains a polyvinyl acetal resin and a plasticizer.

The main feature of the present embodiment is that, in the case (test method A) of measuring viscoelasticity of a resin film A formed with 100 parts by weight of the polyvinyl acetal resin contained in the first layer 2 and 60 parts by weight of a plasticizer of triethylene glycol di-2-ethylhexanoate (3GO), the resin film A, having a glass transition temperature of Tg (° C.), has an elastic modulus of G'(Tg+80) at (Tg+80)° C. and an elastic modulus of G'(Tg+30) at (Tg+30)° C., and provides a ratio (G'(Tg+80)/G'(Tg+30)) of 0.65 or higher.

Also in the present embodiment, in the case (test method B) of measuring viscoelasticity of a resin film B formed from the first layer 2, the resin film B, having a glass transition temperature of Tg (° C.), has an elastic modulus of G'(Tg+80) at (Tg+80)° C. and an elastic modulus of G'(Tg+30) at (Tg+30)° C., and provides a ratio (G'(Tg+80)/G'(Tg+30)) of 0.65 or higher.

In test method B, the resin film B is formed from the first layer 2, i.e., the first layer 2 itself serves as the resin film B.

The resin film B is the first layer 2 that contains the polyvinyl acetal resin and the plasticizer at the same weight ratio as that in the first layer 2. In test method B, the elastic modulus G'(Tg+80) and the elastic modulus G'(Tg+30) are preferably measured after the plasticizer is migrated in the interlayer film 1 for a laminated glass. In test method B, the elastic modulus G'(Tg+80) and the elastic modulus G'(Tg+30) are preferably measured after the interlayer film 1 for a laminated glass is stored at the humidity of 30% (±3%) and the temperature of 23° C. for one month and the plasticizer is migrated in the interlayer film 1 for a laminated glass.

The present inventors have found that the plasticizer migrates between the layers in a laminated interlayer film for a laminated glass, and as a result, a layer containing a large amount of the plasticizer is formed; for example, the plasticizer migrates from the second layer and the third layer to the first layer, and the first layer turns out to contain a large amount of the plasticizer. The present inventors have also found that, formation of a layer containing a large amount of the plasticizer, i.e., a large amount of the plasticizer in the first layer, may easily cause bubble formation in a laminated glass including the interlayer film for a laminated glass, and once bubbles is generated, the bubbles may grow with the generated bubbles as the core.

The present inventors have made various studies to suppress bubble formation and bubble growth, and have found that bubble formation and bubble growth in a laminated glass can be sufficiently suppressed if the above ratio (G'(Tg+80)/G'(Tg+30)) in test method A or test method B is 0.65 or more. The bubble formation and bubble growth in the laminated glass can be sufficiently suppressed even if the first layer contains a large amount of the plasticizer. Therefore, the sound insulation of the laminated glass can be increased. Particularly in the case that the interlayer film for a laminated glass is used which has the second layer and the third layer laminated on the respective faces of the first layer providing the ratio (G'(Tg+80)/G'(Tg+30)) of 0.65 or higher, the bubble formation and bubble growth in the laminated glass can be further suppressed.

The ratio (G'(Tg+80)/G'(Tg+30)) is 0.65 or higher, and is preferably 1.0 or lower. If the ratio (G'(Tg+80)/G'(Tg+30)) is 0.65 or higher, the bubble formation and bubble growth in the laminated glass can be sufficiently suppressed even in the case that the laminated glass is stored under considerably severe conditions or stored for a long period of time. Further, if the ratio (G'(Tg+80)/G'(Tg+30)) is within the range of the lower limit value to the upper limit value, the bubble formation and bubble growth in the laminated glass can be even more effectively suppressed even in the case that the laminated glass is stored under considerably severe conditions or stored for a long period of time. The glass transition temperature Tg (° C.) represents the peak temperature of the loss tangent tan δ determined from the test results of the above viscoelasticity measurement.

The glass transition temperature Tg (° C.) represents the peak temperature of the loss tangent tan δ determined from the test results of the above viscoelasticity measurement. In terms of further suppressing bubble formation and bubble growth in a laminated glass, the ratio (G'(Tg+80)/G'(Tg+30)) is more preferably 0.7 or higher, more preferably 0.95 or lower, still more preferably 0.75 or higher, and still more preferably 0.9 or lower. Particularly, in the case that the ratio (G'(Tg+80)/G'(Tg+30)) is controlled with the average degree of polymerization of the polyvinyl alcohol resin, bubble formation and bubble growth in the laminated glass can be sufficiently suppressed and the sound insulation of the laminated glass can be further increased. The ratio (G'(Tg+80)/G'(Tg+30)) is preferably 0.65 or higher, more preferably 0.66 or higher, still more preferably 0.67 or higher, and particularly preferably 0.7 or higher. Further, the ratio is preferably 0.82 or lower, and more preferably 0.8 or lower. If the ratio (G'(Tg+80)/G'(Tg+30)) is 0.82 or lower or 0.8 or lower, the interlayer film can be easily formed.

Examples of the method of setting the ratio (G'(Tg+80)/G'(Tg+30)) in test method A or test method B to 0.65 or higher include the method of using a polyvinyl alcohol resin having a comparatively high average degree of polymerization in synthesis of a polyvinyl acetal resin in the first layer 2; and the method of increasing the interaction between the molecules of the polyvinyl acetal resin in the first layer 2. Examples of the method of increasing the interaction between the molecules of the polyvinyl acetal resin in the first layer 2 include the method of physically crosslinking the molecules of the polyvinyl acetal resin, and the method of chemically crosslinking the molecules. Preferable among these are the method of using a polyvinyl alcohol resin having a comparatively high average degree of polymerization in synthesis of a polyvinyl acetal resin in the first layer 2, and the method of physically crosslinking the molecules of the polyvinyl acetal resin in the first layer 2, in terms of easy formation of the interlayer film with an extruder.

One example of the relation between the loss tangent tan δ and the temperature and the relation between the elastic modulus G' and the temperature will be described by means of FIG. 3.

Figure 3:
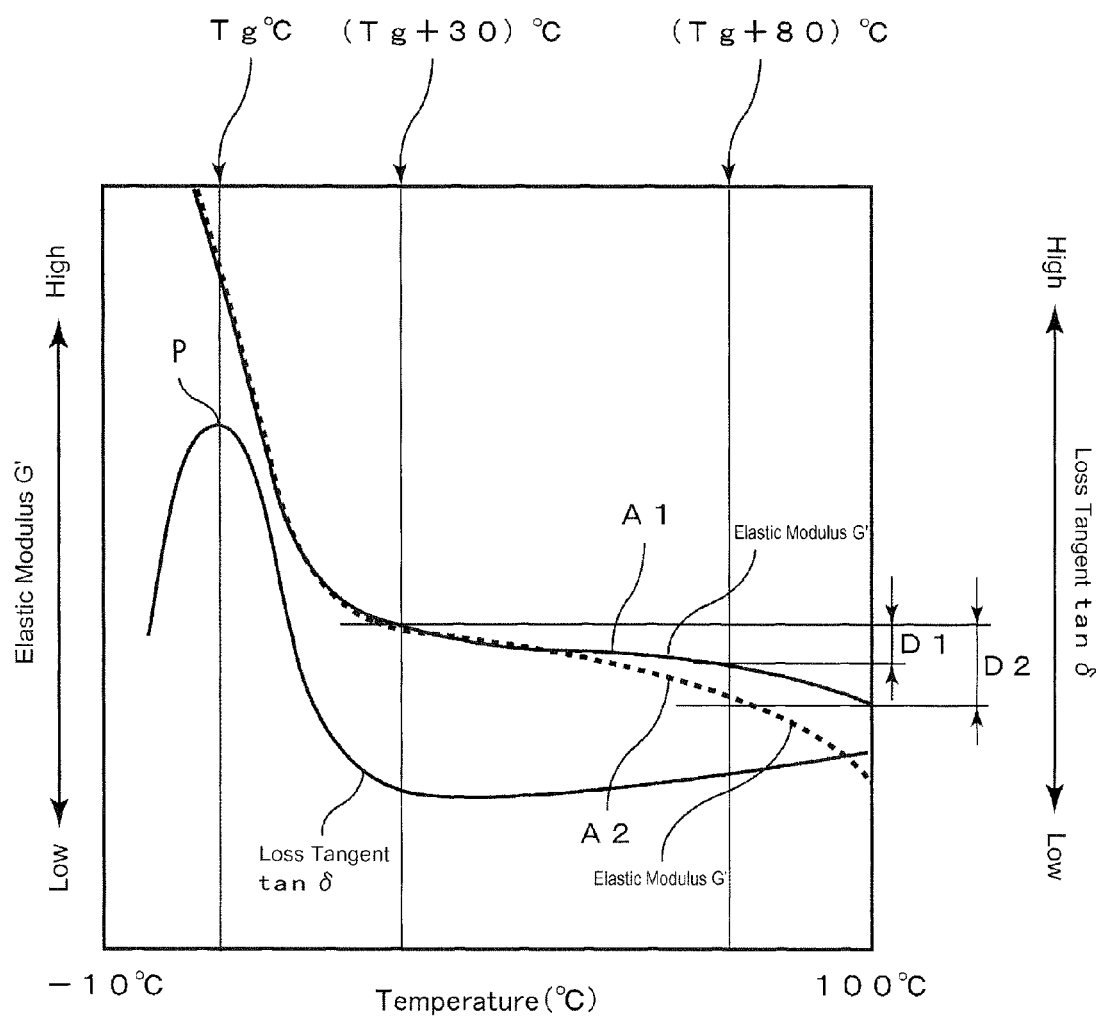
FIG. 3 is a view for explaining the relation between a loss tangent tan δ and the temperature and the relation between an elastic modulus G' and the temperature, which have resulted from measurement of the viscoelasticity of a resin film containing the polyvinyl acetal resin in the first layer and triethylene glycol di-2-ethylhexanoate.

The loss tangent tan δ and the temperature are in the relation shown in FIG. 3. The temperature at the peak P of the loss tangent tan δ is the glass transition temperature Tg.

The glass transition temperature Tg of the elastic modulus G' of the dashed line A2 illustrated in FIG. 3 is the same as the glass transition temperature Tg of the elastic modulus G' of the solid line A1. For example, if the amount D of change in the elastic modulus G'(Tg+80) based on the elastic modulus G'(Tg+30) is smaller, bubble formation and bubble growth in the laminated glass can be more effectively suppressed. The amount D1 of change in the elastic modulus G' of the solid line A1 is smaller than the amount D2 of change in the elastic modulus G' of the dashed line A2. Accordingly, bubble formation and bubble growth in the laminated glass can be more effectively suppressed in the case that the resin film shows the elastic modulus G' of the solid line A1 with a comparatively small amount D1 of change than in the case that the resin film shows the elastic modulus G' of the dashed line A2 with a comparatively large amount D2 of change in FIG. 3.

The G'(Tg+30) is preferably 200,000 Pa or higher. The G'(Tg+30) is more preferably 220,000 Pa or higher, still more preferably 230,000 Pa or higher, and particularly preferably 240,000 Pa or higher. Further, the G'(Tg+30) is preferably 10 million Pa or lower, more preferably 5 million Pa or lower, particularly preferably 1 million Pa or lower, more particularly preferably 500,000 Pa or lower, and still more particularly preferably 300,000 Pa or lower. If the G'(Tg+30) is equal to or higher than the above lowest value, bubble formation and bubble growth in the laminated glass can be even more effectively suppressed.

The relation between the elastic modulus G' and the temperature is greatly influenced by the kind of the polyvinyl acetal resin, particularly the average degree of polymerization of the polyvinyl alcohol resin used to obtain the polyvinyl acetal resin. The relation is not much influenced by the kind of plasticizer or the amount of a plasticizer used if the plasticizer is a common one. The ratio (G'(Tg+80)/G'(Tg+30)) in the case of replacing the plasticizer 3GO with a plasticizer other than 3GO, such as a monobasic organic acid ester, particularly the ratio (G'(Tg+80)/G'(Tg+30)) in the case of using plasticizers of triethylene glycol di-2-ethylbutyrate (3GH) and triethylene glycol di-n-heptanoate (3G7), is not greatly different from the ratio (G'(Tg+80)/G'(Tg+30)) in the case of using 3GO. Also, in the case that the amount of the plasticizer is 50 to 80 parts by weight for each 100 parts by weight of the polyvinyl acetal resin, the values of the ratio (G'(Tg+80)/G'(Tg+30)) are not greatly different. The ratio (G'(Tg+80)/G'(Tg+30)) determined using a resin film that contains 100 parts by weight of a polyvinyl acetal resin and 60 parts by weight of a plasticizer of triethylene glycol di-2-ethylhexanoate (3GO) is not largely different from the ratio (G'(Tg+80)/G'(Tg+30)) determined using the first layer 2. Both of the ratio (G'(Tg+80)/G'(Tg+30)) determined in test method A and the ratio (G'(Tg+80)/G'(Tg+30)) determined in test method B are preferably 0.65 or higher, and it is more preferable that the ratio (G'(Tg+80)/G'(Tg+30)) determined in test method B is 0.65 or higher.

If the first layer 2 has 50 parts by weight or more of the plasticizer for each 100 parts by weight of the polyvinyl acetal resin, the sound insulation of the laminated glass can be sufficiently increased.

Hereinafter, components contained in each of the first layer, the second layer and the third layer in the interlayer film 1 will be described in detail.

(Polyvinyl Acetal Resin)

In the case of containing a polyvinyl acetal resin and a plasticizer, each of the first layer 2, the second layer 3 and the third layer 4 in the interlayer film 1 can show high adhesion. As a result, the interlayer film 1 can provide even higher adhesion to the laminated-glass components.

The polyvinyl acetal resin in the first layer 2 can be produced by acetalizing a polyvinyl alcohol resin with an aldehyde. The polyvinyl acetal resin in the first layer 2 is a polyvinyl acetal resin obtained by acetalizing a polyvinyl alcohol resin.

In terms of further suppressing bubble formation and bubble growth in the laminated glass, the polyvinyl acetal resin in the first layer is preferably obtained by acetalizing a polyvinyl alcohol resin having an average degree of polymerization exceeding 3000.

In terms of further suppressing bubble formation and bubble growth in the laminated glass, the lowest average degree of polymerization of the polyvinyl alcohol resin used to obtain the polyvinyl acetal resin in the first layer 2 is preferably 3010, preferably 3050, preferably 3500, preferably 3600, preferably 4000, and preferably 4050. The highest average degree is preferably 7000, preferably 6000, preferably 5000, preferably 4900, and preferably 4500. Particularly in terms of further suppressing bubble formation and bubble growth in the laminated glass, sufficiently increasing the sound insulation of the laminated glass, and easily forming an interlayer film, the average degree of polymerization of the polyvinyl alcohol resin used to obtain the polyvinyl acetal resin in the first layer 2 is preferably 3010 or higher, and more preferably 3020 or higher. The average degree is also preferably 4000 or lower, more preferably lower than 4000, still more preferably 3800 or lower, particularly preferably 3600 or lower, and most preferably 3500 or lower.

The present inventors have also found that if the average degree of polymerization of the polyvinyl alcohol resin used to obtain the polyvinyl acetal resin in the first layer is equal to or higher than the above lowest degree, the ratio (G'(Tg+80)/G'(Tg+30)) in test method A or test method B can easily be set to a value that satisfies the lowest value and the highest value.

In the present invention, the first layer 2 may contain, as the polyvinyl acetal resin, only a polyvinyl acetal resin obtained by acetalizing a polyvinyl alcohol resin having an average degree of polymerization exceeding 3000, or may contain such a polyvinyl acetal resin obtained by acetalizing a polyvinyl alcohol resin having an average degree of polymerization exceeding 3000 in combination with another polyvinyl acetal resin. The other polyvinyl acetal resin may be a polyvinyl acetal resin (hereinafter also referred to as a "polyvinyl acetal resin Z") obtained by acetalizing a polyvinyl alcohol resin having an average degree of polymerization of 3000 or lower. In this case, the minimum amount of the polyvinyl acetal resin obtained by acetalizing a polyvinyl alcohol resin having an average degree of polymerization exceeding 3000 relative to 100% by weight of the total amount of the polyvinyl acetal resin obtained by acetalizing a polyvinyl alcohol resin having an average degree of polymerization exceeding 3000 and the polyvinyl acetal resin Z is preferably 5% by weight, more preferably 50% by weight, still more preferably 70% by weight, and particularly preferably 90% by weight. Also, the maximum amount thereof is preferably 100% by weight, and more preferably 95% by weight. In terms of further suppressing bubble formation and bubble growth in the laminated glass, the other polyvinyl acetal resin is preferably a polyvinyl acetal resin obtained by acetalizing a polyvinyl alcohol resin having a degree of polymerization exceeding 3000.

The average degree of polymerization of the polyvinyl alcohol resin is determined by a method based on JIS K6726 "Testing Methods for Polyvinyl alcohol".

The polyvinyl acetal resin in each of the second layer 3 and the third layer 4 can be produced by acetalizing a polyvinyl alcohol resin. The lowest average degree of polymerization of the polyvinyl alcohol resin used to obtain the polyvinyl acetal resin in each of the second layer 3 and the third layer 4 is preferably 200, more preferably 500, still more preferably 1000, and particularly preferably 1500. The highest average degree is preferably 4000, more preferably 3500, still more preferably 3000, and particularly preferably 2500. If the average degree of polymerization satisfies the lowest degree, the penetration resistance of the laminated glass can be further increased. Further, if the average degree of polymerization satisfies the highest degree, formation of an interlayer film is facilitated.

The average degree of polymerization of the polyvinyl alcohol resin used to obtain the polyvinyl acetal resin in the first layer 2 is preferably higher than the average degree of polymerization of the polyvinyl alcohol resin used to obtain the polyvinyl acetal resin in each of the second layer 3 and the third layer 4 by preferably 500 or more, more preferably 800 or more, still more preferably 1000 or more, even more preferably 1300 or more, and particularly preferably 1800 or more.

The polyvinyl alcohol resin is obtained by, for example, saponifying polyvinyl acetate. The degree of saponification of the polyvinyl alcohol resin is generally within the range of 70 to 99.9 mol %, preferably within the range of 75 to 99.8 mol %, and more preferably within the range of 80 to 99.8 mol %.

The aldehyde is not particularly limited. Generally, a C1 to C10 aldehyde is suitably used as the above aldehyde. Examples of the C1 to C10 aldehyde include propionaldehyde, n-butyraldehyde, isobutyraldehyde, N-valeraldehyde, 2-ethylbutyraldehyde, n-hexyl aldehyde, n-octyl aldehyde, n-nonyl aldehyde, n-decyl aldehyde, formaldehyde, acetaldehyde, and benzaldehyde. Particularly, n-butyraldehyde, n-hexyl aldehyde, and n-valeraldehyde are preferable, and n-butyraldehyde is more preferable. Each of the above aldehydes may be used alone, or two or more of the aldehydes may be used in combination.

The polyvinyl acetal resin is preferably a polyvinyl butyral resin. The polyvinyl acetal resin in each of the first layer, the second layer and the third layer preferably includes a polyvinyl butyral resin. A polyvinyl butyral resin can be easily synthesized. Use of a polyvinyl butyral resin contributes to even more appropriate adhesion of the interlayer film 1 to the laminated-glass components. Further, the use leads to a further increase in the properties such as light resistance and weatherability.

The minimum hydroxyl content (the amount of the hydroxyl group) of the polyvinyl acetal resin in the first layer 2, which is an intermediate layer, is preferably 16 mol %, more preferably 18 mol %, still more preferably 20 mol %, and particularly preferably 22 mol %. The maximum hydroxyl content is preferably 30 mol %, more preferably 29 mol %, still more preferably 27 mol %, and particularly preferably 25 mol %. If the hydroxyl content satisfies the preferable minimum amount, the first layer 2 can provide even higher adhesion. If the hydroxyl content satisfies the preferable maximum value, the laminated glass can provide even higher sound insulation. Further, the interlayer film 1 can have higher flexibility, and can therefore show even higher handling properties.

If the hydroxyl content of the polyvinyl acetal resin is low, the hydrophilicity of the polyvinyl acetal resin is low. Hence, the amount of the plasticizer used can be increased and, as a result, the sound insulation of the laminated glass can be further increased. If the hydroxyl content of the polyvinyl acetal resin in the first layer 2 is lower than the hydroxyl content of the polyvinyl acetal resin in each of the second layer 3 and the third layer 4, the amount of the plasticizer in the first layer 2 can be increased. In terms of a further increase in the sound insulation of the laminated glass, the hydroxyl content of the polyvinyl acetal resin in the first layer 2 is lower than the hydroxyl content of the polyvinyl acetal resin in each of the second layer 3 and the third layer 4 by preferably 2 mol % or more, more preferably 4 mol % or more, still more preferably 6 mol % or more, and particularly preferably 8 mol % or more.

The minimum hydroxyl content of the polyvinyl acetal resin in each of the second layer 3 and the third layer 4, which are surface layers, is preferably 26 mol %, more preferably 27 mol %, still more preferably 28 mol %, particularly preferably 29 mol %, and more particularly preferably 30 mol %. The maximum hydroxyl content is preferably 35 mol %, more preferably 34 mol %, still more preferably 33 mol %, particularly preferably 32 mol %, and most preferably 31.5 mol %. If the hydroxyl content satisfies the preferable minimum value, the interlayer film 1 can provide even higher adhesion. Further, if the hydroxyl content satisfies the preferable maximum value, the interlayer film 1 can have higher flexibility, and can therefore show even higher handling properties.

The hydroxyl content of the polyvinyl acetal resin is a molar fraction determined by dividing the amount of ethylene group having the hydroxyl group bonded thereto by the total amount of the ethylene group in the main chain, represented in percentage (mol %). The amount of ethylene group having the hydroxyl group bonded thereto can be determined by, for example, determining the amount of ethylene group having the hydroxyl group bonded thereto in the polyvinyl acetal resin according to the method based on JIS K6728 "Testing Methods for Polyvinyl butyral".

The degree of acetylation (the amount of acetyl groups) of the polyvinyl acetal resin in the first layer 2 is preferably 30 mol % or lower. If the degree of acetylation exceeds 30 mol %, the reaction efficiency in production of a polyvinyl acetal resin may decrease.

The lowest degree of acetylation of the polyvinyl acetal resin in the first layer 2 is preferably 0.1 mol %, more preferably 0.5 mol %, and still more preferably 0.8 mol %. The highest degree is preferably 24 mol %, more preferably 20 mol %, still more preferably 19.5 mol %, and particularly preferably 15 mol %. The lowest degree of acetylation of the polyvinyl acetal resin in each of the second layer 3 and the third layer 4 is preferably 0.1 mol %, more preferably 0.5 mol %, and still more preferably 0.8 mol %. The highest degree is preferably 20 mol %, more preferably 5 mol %, still more preferably 2 mol %, and particularly preferably 1.5 mol %. If the degree of acetylation satisfies the preferable lowest degree, the compatibility of the polyvinyl acetal resin and the plasticizer is further increased. If the degree of acetylation satisfies the preferable highest degree, the moisture resistance of the interlayer film can be further increased. In terms of a further increase in sound insulation of the laminated glass, if the degree of acetalization of the polyvinyl acetal resin in the first layer 2 is lower than the degree of acetalization of the polyvinyl acetal resin in each of the second layer 3 and the third layer 4, the degree of acetylation of the polyvinyl acetal resin in the first layer 2 is higher than the degree of acetylation of the polyvinyl acetal resin in each of the second layer 3 and the third layer 4 by preferably 3 mol % or more, more preferably 5 mol % or more, still more preferably 7 mol % or more, and particularly preferably 10 mol % or more.

The degree of acetylation is a molar fraction determined by dividing, by the total amount of ethylene group in the main chain, a value resulting from subtracting the amount of ethylene group having the acetal group bonded thereto and the amount of ethylene group having the hydroxyl group bonded thereto from the total amount of ethylene group in the main chain, represented in percentage (mol %). The amount of ethylene group having the acetal group bonded thereto can be determined based on JIS K6728 "Testing Methods for Polyvinyl butyral", for example.

The lowest degree of acetalization of the polyvinyl acetal resin in the first layer 2 is preferably 50 mol %, more preferably 54 mol %, still more preferably 58 mol %, and particularly preferably 60 mol %. The highest degree is preferably 85 mol %, more preferably 80 mol %, and still more preferably 79 mol %. The lowest degree of acetalization of the polyvinyl acetal resin in each of the second layer 3 and the third layer 4 is preferably 60 mol %, more preferably 65 mol %, still more preferably 66 mol %, and particularly preferably 67 mol %. The highest degree is preferably 75 mol %, more preferably 72 mol %, still more preferably 71 mol %, and particularly preferably 70 mol %. If the degree of acetalization satisfies the preferable lowest degree, the compatibility of the polyvinyl acetal resin and the plasticizer can be further increased. If the degree of acetalization satisfies the preferable highest degree, the reaction time required to produce a polyvinyl acetal resin can be shortened. In terms of a further increase in sound insulation of the laminated glass, if the absolute value of the difference between the degree of acetylation of the polyvinyl acetal resin in the first layer 2 and the degree of acetylation of the polyvinyl acetal resin in each of the second layer 3 and the third layer 4 is 3 or less, the degree of acetalization of the polyvinyl acetal resin in the first layer 2 is higher than the degree of acetalization of the polyvinyl acetal resin in each of the second layer 3 and the third layer 4 by preferably 3 mol % or more, more preferably 5 mol % or more, still more preferably 7 mol % or more, and particularly preferably 10 mol % or more.

The degree of acetalization is a molar fraction determined by dividing the amount of ethylene group having the acetal group bonded thereto by the total amount of ethylene group in the main chain, represented in percentage (mol %).

The degree of acetalization is calculated by first measuring the amounts of the acetyl group and the vinyl alcohol (hydroxyl content) based on JIS K6728 "Testing Methods for Polyvinyl butyral", calculating the molar fraction from the measured amounts, and subtracting the amounts of acetyl and vinyl alcohol from 100 mol %.

In terms of further suppressing bubble formation and bubble growth in the laminated glass and further increasing the sound insulation of the laminated glass, the polyvinyl acetal resin in the first layer 2 is preferably a polyvinyl acetal resin having a degree of acetylation of lower than 8 mol % (hereinafter also referred to as "polyvinyl acetal resin A") or a polyvinyl acetal resin having a degree of acetylation of 8 mol % or higher (hereinafter also referred to as "polyvinyl acetal resin B").

The degree a of acetylation of the polyvinyl acetal resin A is lower than 8 mol %, preferably 7.5 mol % or lower, preferably 7 mol % or lower, preferably 6 mol % or lower, and preferably 5 mol % or lower. The degree a of acetylation is preferably 0.1 mol % or higher, preferably 0.5 mol % or higher, preferably 0.8 mol % or higher, preferably 1 mol % or higher, preferably 2 mol % or higher, preferably 3 mol % or higher, and preferably 4 mol % or higher. If the degree a of acetylation is within the range from the lowest value to the highest value, the compatibility of the polyvinyl acetal resin and the plasticizer can be further increased, and the sound insulation of the laminated glass can therefore be further increased.

The lowest degree a of acetalization of the polyvinyl acetal resin A is 68 mol %, more preferably 70 mol %, still more preferably 71 mol %, and particularly preferably 72 mol %. The highest degree is preferably 85 mol %, more preferably 83 mol %, still more preferably 81 mol %, and particularly preferably 79 mol %. If the degree a of acetalization is equal to or higher than the lowest value, the sound insulation of the laminated glass can be further increased. If the degree a of acetalization is equal to or lower than the highest value, the reaction time required to produce the polyvinyl acetal resin A can be shortened.

The hydroxyl content a of the polyvinyl acetal resin A is preferably 30 mol % or lower, preferably 27.5 mol % or lower, preferably 27 mol % or lower, preferably 26 mol % or lower, preferably 25 mol % or lower, preferably 24 mol % or lower, and preferably 23 mol % or lower. The hydroxyl content a is preferably 16 mol % or higher, preferably 18 mol % or higher, preferably 19 mol % or higher, and preferably 20 mol % or higher. If the hydroxyl content a is equal to or lower than the highest value, the sound insulation of the laminated glass can be further increased. If the hydroxyl content a is equal to or higher than the lowest value, the adhesion of the interlayer film can be further increased.

The polyvinyl acetal resin A is preferably a polyvinyl butyral resin.

The degree b of acetylation of the polyvinyl acetal resin B is 8 mol % or higher, preferably 9 mol % or higher, preferably 10 mol % or higher, preferably 11 mol % or higher, and preferably 12 mol % or higher. The degree b of acetylation is preferably 30 mol % or lower, preferably 28 mol % or lower, preferably 26 mol % or lower, preferably 24 mol % or lower, preferably 20 mol % or lower, and preferably 19.5 mol % or lower. If the degree b of acetylation is equal to or higher than the lowest value, the sound insulation of the laminated glass can be further increased. If the degree b of acetylation is equal to or lower than the highest value, the reaction time required to produce the polyvinyl acetal resin B can be shortened. In terms of further shortening the reaction time required to produce the polyvinyl acetal resin B, the degree b of acetylation of the polyvinyl acetal resin B is preferably lower than 20 mol %.

The degree b of acetalization of the polyvinyl acetal resin B is 50 mol % or higher, more preferably 52.5 mol % or higher, still more preferably 54 mol % or higher, and particularly preferably 60 mol % or higher. The degree b of acetalization is preferably 80 mol % or lower, more preferably 77 mol % or lower, still more preferably 74 mol % or lower, and particularly preferably 71 mol % or lower. If the degree b of acetalization is equal to or higher than the lowest value, the sound insulation of the laminated glass can be further increased. If the degree b of acetalization is equal to or lower than the highest value, the reaction time required to produce the polyvinyl acetal resin B can be shortened.

The hydroxyl content b of the polyvinyl acetal resin B is preferably 30 mol % or lower, preferably 27.5 mol % or lower, preferably 27 mol % or lower, preferably 26 mol % or lower, and preferably 25 mol % or lower. The hydroxyl content b is preferably 18 mol % or higher, preferably 20 mol % or higher, preferably 22 mol % or higher, and preferably 23 mol % or higher. If the hydroxyl content b is equal to or lower than the highest value, the sound insulation of the laminated glass can be further increased. If the hydroxyl content b is equal to or higher than the lowest value, the adhesion of the interlayer film can be further increased.

The polyvinyl acetal resin B is preferably a polyvinyl butyral resin.

The polyvinyl acetal resin A and the polyvinyl acetal resin B each are preferably obtained by acetalizing with an aldehyde a polyvinyl alcohol resin having an average degree of polymerization exceeding 3000. The aldehyde is preferably a C1 to C10 aldehyde, and is more preferably a C4 or C5 aldehyde. The lowest average degree of polymerization of the polyvinyl alcohol resin is preferably 3010, preferably 3050, preferably 3500, preferably 3600, preferably 4000, and preferably 4050. The highest average degree is preferably 7000, preferably 6000, preferably 5000, preferably 4900, and preferably 4500. The polyvinyl acetal resin in the first layer 2 is particularly preferably obtained by acetalizing a polyvinyl alcohol resin having an average degree of polymerization exceeding 3000 and lower than 4000. Particularly, in terms of further suppressing bubble formation and bubble growth in the laminated glass, sufficiently increasing the sound insulation of the laminated glass, and easily forming an interlayer film, the average degree of polymerization of the polyvinyl alcohol resin used to obtain the polyvinyl acetal resin in the first layer 2 is preferably 3010 or higher, and more preferably 3020 or higher. The average degree of polymerization is preferably 4000 or lower, more preferably lower than 4000, still more preferably 3800 or lower, particularly preferably 3600 or lower, and most preferably 3500 or lower.

The molecular-weight distribution (weight-average molecular weight Mw/number-average molecular weight Mn) of the polyvinyl acetal resin in the first layer 2 is generally 1.1 or higher, preferably 1.2 or higher, and more preferably 2 or higher. The molecular-weight distribution is preferably 6.7 or lower, more preferably 6.5 or lower, and still more preferably 3.4 or lower.

The lowest molecular-weight distribution of the polyvinyl acetal resin in the first layer 2 is preferably 1.2, more preferably 1.5, still more preferably 2.0, and particularly preferably 2.5. The highest molecular-weight distribution is preferably 5.5, more preferably 5, still more preferably 4.6, and particularly preferably 3.2. The molecular-weight distribution of the polyvinyl acetal resin in the first layer 2 is particularly preferably 2.5 to 3.2. The molecular-weight distribution represents the ratio of the weight-average molecular weight Mw of the polyvinyl acetal resin in the first layer 2 to the number-average molecular weight Mn of the polyvinyl acetal resin in the first layer 2. The present inventors have also found that, if the molecular-weight distribution of the polyvinyl acetal resin in the first layer is within the range from the lowest value to the highest value or is 2.5 to 3.2, it is easy to set the ratio (G'(Tg+80)/G'(Tg+30)) in test method A or test method B to a value satisfying the above lowest value and the highest value, and to more effectively suppress bubble formation and bubble growth in the laminated glass. Particularly, in terms of more effectively suppressing bubble formation and bubble growth in the laminated glass and further increasing the sound insulation of the laminated glass, it is preferable that the molecular-weight distribution of the polyvinyl acetal resin in the first layer 2 is 6.5 or lower, and the amount of the plasticizer for each 100 parts by weight of the polyvinyl acetal resin in the first layer 2 is 50 parts by weight or more. Particularly in the case that the polyvinyl acetal resin in the first layer 2 contains the polyvinyl acetal resin B, it is preferable that the molecular-weight distribution of the polyvinyl acetal resin B is 6.5 or lower, and the amount of the plasticizer for each 100 parts by weight of the polyvinyl acetal resin in the first layer 2 is preferably 55 parts by weight or more.

The weight-average molecular weight and the number-average molecular weight respectively represent the polystyrene-equivalent weight-average molecular weight and number-average molecular weight determined by gel permeation chromatography (GPC). For example, in order to determine the polystyrene-equivalent weight-average molecular weight and number-average molecular weight, GPC measurement of the polystyrene standard samples the molecular weight of which are known is performed. The polystyrene standard samples used ("Shodex Standard SM-105" and "Shodex Standard SH-75" produced by Showa Denko K.K.) are 14 samples having weight-average molecular weights of 580, 1260, 2960, 5000, 10100, 21000, 28500, 76600, 196000, 630000, 1130000, 2190000, 3150000, and 3900000. An approximation straight line, obtained by plotting the molecular weights relative to the elution times shown by the peak tops of the respective standard sample peaks, can be used as a calibration curve. The surface layers (the second layer 3 and the third layer 4) and the intermediate layer (the first layer 2) are separated from the laminated interlayer film that has been left to stand in a constant temperature and humidity room (humidity: 30% (±3%), temperature: 23° C.) for one month. The separated first layer (intermediate layer) is dissolved in tetrahydrofuran (THF) so that 0.1% by weight of a solution is prepared. The solution is analyzed with a GPC device to determine the weight-average molecular weight and the number-average molecular weight thereof. The GPC device used to determine the weight-average molecular weight and the number-average molecular weight may be a GPC device (produced by Hitachi High-technologies Corporation, "RI: L2490, autosampler: L-2200, pump: L-2130, column oven: L-2350, column: GL-A120-S and GL-A100MX-S in series") to which a light scattering detector for GPC ("Model 270 (RALS+VISCO)" produced by VISCOTEK) is connected.

In terms of further suppressing bubble formation and bubble growth in the laminated glass and obtaining a laminated glass with excellent sound insulation, the polyvinyl acetal resin in the first layer 2 is preferably a carboxylic acid-modified polyvinyl acetal resin, and more preferably a carboxylic acid-modified polyvinyl butyral resin. Use of a carboxylic acid-modified polyvinyl acetal resin makes it easy to set the ratio (G'(Tg+80)/G'(Tg+30)) in test method A or test method B to a value that satisfies the lowest value and the highest value. The carboxylic acid-modified polyvinyl acetal resin contains ethylene group having an acetal group, ethylene group having an acetyl group, and ethylene group having a hydroxyl group. Examples of the carboxylic acid include unsaturated dicarboxylic acids and unsaturated tricarboxylic acids. The carboxylic acid is preferably an unsaturated dicarboxylic acid such as maleic acid and itaconic acid. If the total amount of the ethylene group having an acetal group, the ethylene group having an acetyl group, the ethylene group having a hydroxyl group, and the ethylene group modified with the above carboxylic acid is set to 100 mol %, the proportion of the ethylene group modified with the above carboxylic acid is preferably higher than 0 mol % and 10 mol % or lower. The highest proportion of the ethylene group modified with the above carboxylic acid is preferably 9 mol %, preferably 8 mol %, preferably 7 mol %, preferably 6 mol %, preferably 5 mol %, preferably 4 mol %, preferably 3 mol %, and preferably 2 mol %.

(Plasticizer)

The plasticizer in each of the first layer 2, the second layer 3 and the third layer 4 is not particularly limited. The plasticizer may be a publicly known plasticizer. One plasticizer may be used or two or more plasticizers may be used in combination as the above plasticizer.

Examples of the plasticizer include organic ester plasticizers such as a monobasic organic acid ester and a polybasic organic acid ester, and phosphorus plasticizers such as an organic phosphorus acid plasticizer and an organic phosphorous acid plasticizer. Among these, an organic ester plasticizer is preferable. The plasticizer is preferably a liquid plasticizer.

Examples of the monobasic organic acid ester include, but not particularly limited to, a glycol ester obtained through the reaction of glycol and a monobasic organic acid, and an ester of a monobasic organic acid and triethylene glycol or tripropylene glycol. Examples of the glycol include triethylene glycol, tetraethylene glycol, and tripropylene glycol. Examples of the monobasic organic acid include butanoic acid, isobutyric acid, caproic acid, 2-ethylbutanoic acid, heptylic acid, n-octyl acid, 2-ethylhexyl acid, n-nonylic acid, and decylic acid.

Examples of the polybasic organic acid ester include, but not particularly limited to, ester compounds such as one of a polybasic organic acid and a C4 to C8 straight or branched chain alcohol. Examples of the polybasic organic acid include adipic acid, sebacic acid, and azelaic acid.

Examples of the organic ester plasticizer include, but not particularly limited to, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctylazelate, dibutylcarbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexylcyclohexyl adipate, a mixture of heptyl adipate and nonyl adipate, diisononyl adipate, diisodecyl adipate, heptyl nonyl adipate, dibutyl sebacate, oil-modified alkyd sebacate, and a mixture of phosphate and adipate. An organic ester plasticizer other than these may be used. An adipate other than the above adipates may be used.

Examples of the organic phosphoric acid plasticizer include, but not particularly limited to, tributoxyethyl phosphate, isodecyl phenyl phosphate, and triisopropyl phosphate.

The plasticizer is preferably a diester plasticizer represented by the following formula (1). The use of a diester plasticizer can further increase the sound insulation of the laminated glass.

[Chem. 1]

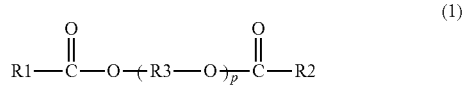

(1)

In formula (1), R1 and R2 each represent a C5 to C10 organic group, R3 represents an ethylene group, an isopropylene group, or an n-propylene group, and p represents an integer of 3 to 10. R1 and R2 in formula (1) each preferably represent a C6 to C10 organic group.

The plasticizer preferably contains at least one compound selected from the group consisting of triethylene glycol di-2-ethylbutyrate (3GH), triethylene glycol di-2-ethylhexanoate (3GO) and triethylene glycol di-n-heptanoate (3G7), and more preferably contains triethylene glycol di-2-ethylhexanoate. The plasticizer in each of the first layer, the second layer and the third layer preferably includes at least one compound selected from the group consisting of triethylene glycol di-2-ethylbutyrate, triethylene glycol di-2-ethylhexanoate, and triethylene glycol di-n-heptanoate. Use of these preferable plasticizers can further increase the sound insulation of the laminated glass.

The amount of the plasticizer in each layer of the interlayer film 1 is not particularly limited.

In terms of sufficiently increasing the sound insulation of the laminated glass, the amount of the plasticizer for each 100 parts by weight of the polyvinyl acetal resin in the first layer 2 is preferably 40 parts by weight or more. Even if the amount of the plasticizer in the first layer 2 is large, bubble formation and bubble growth in the laminated glass can be suppressed because the first layer 2 is formed to provide a ratio (G'(Tg+80)/G'(Tg+30)) of 0.65 or higher.

The minimum amount of the plasticizer for each 100 parts by weight of the polyvinyl acetal resin in the first layer 2 is preferably 45 parts by weight, more preferably 50 parts by weight, particularly preferably 55 parts by weight, and most preferably 60 parts by weight. The maximum amount is preferably 80 parts by weight, more preferably 78 parts by weight, still more preferably 75 parts by weight, and particularly preferably 70 parts by weight. If the amount of the plasticizer satisfies the preferable minimum amount, the penetration resistance of the laminated glass can be further increased. A larger amount of the plasticizer in the first layer 2 leads to even higher sound insulation of the laminated glass. If the amount of the plasticizer satisfies the preferable maximum amount, the interlayer film can provide even higher transparency.

The minimum amount of the plasticizer for each 100 parts by weight of the polyvinyl acetal resin in each of the second layer 3 and the third layer 4 is preferably 25 parts by weight, more preferably 30 parts by weight, and still more preferably 35 parts by weight. The maximum amount is preferably 50 parts by weight, more preferably 45 parts by weight, still more preferably 40 parts by weight, and particularly preferably 39 parts by weight. If the amount of the plasticizer satisfies the preferable minimum amount, the adhesion of the interlayer film is increased, which leads to a further increase in the penetration resistance of the laminated glass. If the amount of the plasticizer satisfies the preferable maximum amount, the transparency of the interlayer film can be further increased.

In terms of further increasing the sound insulation of the laminated glass, the amount of the plasticizer for each 100 parts by weight of the polyvinyl acetal resin in the first layer 2 is preferably larger than the amount of the plasticizer for each 100 parts by weight of the polyvinyl acetal resin in each of the second layer 3 and the third layer 4. In terms of further increasing the sound insulation of the laminated glass, the amount of the plasticizer for each 100 parts by weight of the polyvinyl acetal resin in the first layer 2 is larger than the amount of the plasticizer for each 100 parts by weight of the polyvinyl acetal resin in each of the second layer 3 and the third layer 4 by preferably 5 parts by weight or more, more preferably 10 parts by weight or more, still more preferably 12 parts by weight or more, and particularly preferably 15 parts by weight or more.

(Other Components)

In terms of further suppressing bubble formation and bubble growth in the laminated glass and obtaining a laminated glass with excellent sound insulation, the first layer preferably contains a compound that contains a boron atom. Examples of the compound that contains a boron atom include, but not particularly limited to, tetraborates and boric acid. Examples of the tetraborates include sodium tetraborate and potassium tetraborate. The use of a compound that contains a boron atom makes it easy to set the ratio (G'(Tg+80)/G'(Tg+30)) in test method A or test method B to a value satisfying the minimum amount and the maximum amount.

The minimum amount of the compound that contains a boron atom for each 100 parts by weight of the polyvinyl acetal resin in the first layer 2 is preferably 0.01 parts by weight, more preferably 0.05 parts by weight, and still more preferably 0.1 parts by weight. The maximum amount is preferably 5 parts by weight, more preferably 1 part by weight, and still more preferably 0.5 parts by weight. If the amount of the compound that contains a boron atom satisfies the preferable minimum amount, it is easy to set the ratio (G'(Tg+80)/G'(Tg+30)) in test method A or test method B to a value satisfying the minimum amount and the maximum amount. If the amount of the compound that contains a boron atom satisfies the preferable maximum amount, the transparency of the laminated glass can be further increased.

Each of the first layer 2, the second layer 3 and the third layer 4 of the interlayer film 1 may contain additives such as an ultraviolet ray absorbent, an antioxidant, a light stabilizer, a flame retardant, an antistatic agent, a pigment, a dye, an adhesion regulator, a moisture resistant agent, a fluorescent bleach, and an infrared absorbent.

(Method of Producing Interlayer Film for Laminated Glass, and Laminated Glass)

Examples of the method of producing an interlayer film for a laminated glass according to the present invention include, but not particularly limited to, a method of forming each of the first layer 2, the second layer 3 and the third layer 4 using resin compositions each containing the polyvinyl acetal resin and the plasticizer and, for example, laminating the second layer 3, the first layer 2, and the third layer 4 in the stated order; and a method of co-extruding these resin compositions with an extruder to laminate the second layer 3, the first layer 2, and the third layer 4 in the stated order. In terms of excellent production efficiency of the interlayer film, the second layer 3 and the third layer 4 preferably contain the same polyvinyl acetal resin. More preferably, the second layer 3 and the third layer 4 contain the same polyvinyl acetal resin and the same plasticizer. Still more preferably, the second layer 3 and the third layer 4 are formed from the same resin composition.

Each interlayer film for a laminated glass according to the present invention is used to obtain a laminated glass.

Figure 2:
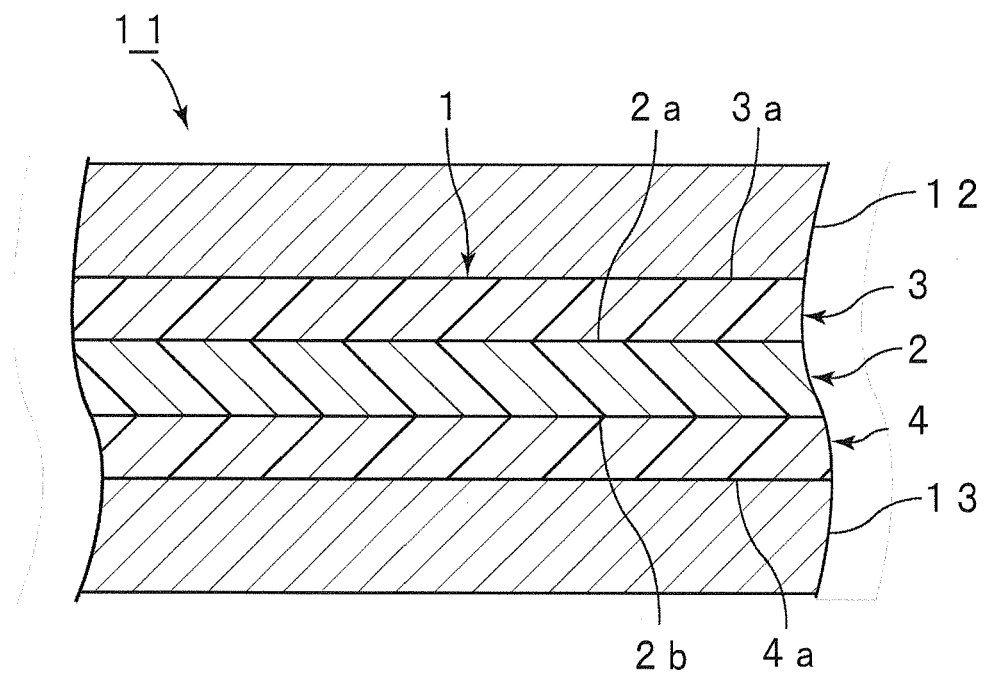
FIG. 2 is a cross-sectional view schematically illustrating one example of a laminated glass including the interlayer film for a laminated glass illustrated in FIG. 1.

FIG. 2 is a cross-sectional view schematically illustrating one example of a laminated glass using the interlayer film 1 in FIG. 1.

A laminated glass 11 in FIG. 2 is provided with a first laminated-glass component 12, a second laminated-glass component 13, and the interlayer film 1. The interlayer film 1 is sandwiched between the first laminated-glass component 12 and the second laminated-glass component 13.

The first laminated-glass component 12 is laminated on an outer surface 3a of the second layer 3. The second laminated-glass component 13 is laminated on an outer surface 4a of the third layer 4. Therefore, the laminated glass 11 has the first laminated-glass component 12, the second layer 3, the first layer 2, the third layer 4, and the second laminated-glass component 13 which are laminated in the stated order.

Examples of the first laminated-glass component 12 and the second laminated-glass component 13 include glass plates and PET (polyethylene terephthalate) films. The laminated glass encompasses not only a laminated glass having an interlayer film sandwiched between two glass plates but also a laminated glass having an interlayer film sandwiched between a glass plate and a PET film. A laminated glass is a laminated product provided with glass plate(s). A laminated glass preferably has at least one glass plate.

Examples of the glass plate include inorganic glasses and organic glasses. Examples of the inorganic glass include float plate glass, heat absorbing plate glass, heat reflecting glass, polished plate glass, molded plate glass, wire plate glass, and lined plate glass. The organic glass is a synthetic resin glass substituted for inorganic glass. Examples of the organic glass include polycarbonate plates and poly(meth)acrylic resin plates. Examples of the poly(meth)acrylic resin plate include polymethyl (meth)acrylate plates.

In terms of further increasing the penetration resistance of the laminated glass 11, the minimum thickness of the interlayer film 1 is preferably 0.05 mm, and more preferably 0.25 mm. The maximum thickness is preferably 3 mm, and more preferably 1.5 mm. If the thickness of the interlayer film 1 satisfies the preferable minimum thickness and the preferable maximum thickness, the penetration resistance and the transparency of the laminated glass can be further increased. The minimum thickness of the first layer 2 is preferably 0.01 mm, more preferably 0.04 mm, and still more preferably 0.07 mm.

The maximum thickness is preferably 0.3 mm, more preferably 0.2 mm, still more preferably 0.18 mm, and particularly preferably 0.16 mm. If the thickness of the first layer 2 satisfies the minimum thickness, the sound insulation of the laminated glass can be further increased. If the thickness satisfies the maximum thickness, the transparency of the laminated glass can be further increased. The minimum thickness of each of the second layer 3 and the third layer 4 is preferably 0.1 mm, more preferably 0.2 mm, still more preferably 0.25 mm, and particularly preferably 0.3 mm. The maximum thickness is preferably 0.6 mm, more preferably 0.5 mm, still more preferably 0.45, and particularly preferably 0.4 mm. If the thickness of each of the second layer 3 and the third layer 4 satisfies the minimum thickness, the penetration resistance of the laminated glass can be further increased. If the thickness satisfies the maximum thickness, the transparency of the laminated glass can be further increased. A smaller ratio of the thickness of the first layer 2 to the thickness of the interlayer film 1 ((thickness of the first layer 2)/(thickness of the interlayer film 1)) and a larger amount of the plasticizer in the first layer 2 tend to cause bubble formation and grow the bubbles in the laminated glass more. Particularly in the case that the ratio in the interlayer film 1 is 0.05 to 0.35 and the amount of the plasticizer for each 100 parts by weight of the polyvinyl acetal resin in the first layer 2 is 55 parts by weight or more, the bubble formation and bubble growth in the laminated glass including the interlayer film for a laminated glass according to the present invention can be sufficiently suppressed and the sound insulation of the laminated glass can be further increased. The minimum value of the ratio (thickness of the first layer 2)/(thickness of the interlayer film 1)) is preferably 0.06, more preferably 0.07, still more preferably 0.08, and particularly preferably 0.1. The maximum value is preferably 0.3, more preferably 0.25, still more preferably 0.2, and particularly preferably 0.15.

The thickness of each of the first laminated-glass component 12 and the second laminated-glass component 13 is preferably 0.5 mm or larger, and more preferably 1 mm or larger. The thickness is also preferably 5 mm or smaller, and more preferably 3 mm or smaller. If the laminated-glass components 12 and 13 are glass plates, the thickness of each glass plate is preferably within the range of 1 to 3 mm. If the laminated-glass components 12 and 13 are PET films, the thickness of each PET film is preferably within the range of 0.03 to 0.5 mm.

The method of producing a laminated glass 11 is not particularly limited. For example, sandwiching the interlayer film 1 between the first laminated-glass component 12 and the second laminated-glass component 13, and then removing the air remaining between the interlayer film and the first laminated-glass component 12 and the second laminated-glass component 13 by pressing the resulting product by pressure rollers, or putting the product in a rubber bag for vacuum-sucking. Then, the product is pre-bonded at about 70° C. to 110° C. to obtain a laminate. Next, the laminate is put into an autoclave or is pressed, so as to be pressure-bonded at about 120° C. to 150° C. and 1 to 1.5 MPa. Thus, the laminated glass 11 can be obtained.

The laminated glass 11 can be widely used for cars, rail cars, aircrafts, boats and ships, buildings, and the like. The laminated glass 11 can be used in applications other than these uses. For example, the laminated glass 11 can be used for windshields, side glass, rear glass, and roof glass of cars.

Hereinafter, the present invention will be described in more detail based on Examples. The present invention is not limited to these Examples.

Example 1

(1) Production of Laminated Interlayer Film

To 100 parts by weight of polyvinyl butyral resin A (hydroxyl content: 23.5 mol %, degree of acetylation: 12.5 mol %, degree of butyralization: 64 mol %) obtained by butyralizing with n-butyl aldehyde a polyvinyl alcohol resin having an average degree of polymerization of 3050, 60 parts by weight of a plasticizer of triethylene glycol di-2-ethylhexanoate (3GO) was added. The mixture was sufficiently kneaded by a mixing roll, so that a resin composition for an intermediate layer was obtained.

To 100 parts by weight of polyvinyl butyral resin B (hydroxyl content: 30.4 mol %, degree of acetylation: 0.8 mol %, degree of butyralization: 68.8 mol %) obtained by butyralizing with n-butyl aldehyde a polyvinyl alcohol resin having an average degree of polymerization of 1700, 37.5 parts by weight of a plasticizer of triethylene glycol di-2-ethylhexanoate (3GO) was added. The mixture was sufficiently kneaded by a mixing roll, so that a resin composition for a surface layer was obtained.

The resin composition for an intermediate layer and the resin composition for a surface layer were co-extruded by an extruder, whereby a laminated interlayer film in which a surface layer (thickness: 350 μm), an intermediate layer (thickness: 100 μm), and a surface layer (thickness: 350 μm) were laminated in the stated order.

(2) Production of Laminated Glass Used for Penetration Resistance Test

The obtained laminated interlayer film was cut into a size of 30 cm (length)×30 cm (width). Next, the laminated interlayer film was sandwiched between two transparent float glasses (30 cm (length)×30 cm (width)×2.5 mm (thickness)), and thereby a laminate was obtained. The layered product was put into a rubber bag and deaerated for 20 minutes at the degree of vacuum of 2.6 kPa, and the deaerated product was put into an oven to further stand at 90° C. for 30 minutes for vacuum-pressing, so that the laminate was pressure-bonded in advance. The preliminary pressure-bonded laminate was pressure-bonded in an autoclave at 135° C. and a pressure of 1.2 MPa for 20 minutes. Thereby, a laminated glass to be used for a penetration resistance test was obtained.

(3) Production of laminated glass used for sound insulation measurement

A laminated glass to be used for sound insulation measurement was produced by the same procedure as that for obtaining a laminated glass to be used for a penetration resistance test, except that the laminated interlayer film was cut into a size of 30 cm (length)×2.5 cm (width) and each of the transparent float glasses used had a size of 30 cm (length)×2.5 cm (width)×2.5 mm (thickness).

(4) Production of Laminated Glass Used for Bubble Formation Test (Laminated Glass Used for Bubble Formation Test in Test Method A)

The obtained laminated interlayer film was cut into a size of 30 cm (length)×15 cm (width), and the cut-out film was left to stand at 23° C. for 10 hours. Here, both faces of the obtained laminated interlayer film were embossed, and the ten-point height of irregularities of the embossing was 30 m. In the cut-out laminated interlayer film, a through hole of 6 mm in diameter was formed at four points, each of which was at a distance of 8 cm inward from an end of the laminated interlayer film in the lengthwise direction and 5 cm inward from an end of the laminated interlayer film in the transverse direction. As a result, a laminated interlayer film having through holes was obtained.

The laminated interlayer film having through holes was sandwiched between two transparent float glasses (30 cm (length)×15 cm (width)×2.5 mm (thickness)), so that a laminate was obtained. The periphery of the laminate was sealed 2 cm from the end with a sealing agent by thermal fusion bonding to encapsulate the air remaining in the embossed parts and in the through holes. The laminate was pressure-bonded at 135° C. and a pressure of 1.2 MPa for 20 minutes, so that the remaining air was dissolved into the laminated interlayer film. Thereby, a laminated glass to be used for a bubble formation test was obtained.

(Laminated Glass Used for Bubble Formation Test in Test Method B)

A laminated glass to be used for the bubble formation test in test method B was obtained by the same procedure as that for obtaining a laminated glass to be used for the bubble formation test in test method A, except that no through hole was formed in the laminated interlayer film.

EXAMPLES 2 TO 46 AND COMPARATIVE EXAMPLES 1 to 12

An interlayer film and a laminated glass were produced by the same procedure as that for Example 1, except that the compositions for the first layer, the second layer and the third layer and the average degree of polymerization of the polyvinyl alcohol resin used to obtain the polyvinyl acetal resin for the first layer were changed to the values shown in the following Tables 1 to 5.

In each of Examples 34 to 36, sodium tetraborate in the amount shown in Table 4 was added for each 100 parts by weight of the polyvinyl acetal resin in preparation of a resin composition for an intermediate layer. In Example 37, an interlayer film and a laminated glass were produced by the same procedure as that for Example 1, except that the resin composition for an intermediate layer contained a carboxylic acid-modified polyvinyl butyral resin (average degree of polymerization: 1800, hydroxyl content: 21.3 mol %, degree of acetylation: 12.6 mol %, degree of butyralization: 64.9 mol %, proportion of carboxylic acid modification: 1.2 mol %) in place of a polyvinyl butyral resin, and the formulations for the first layer, the second layer and the third layer were changed to the ones shown in Table 4. The polyvinyl butyral resins contained in the respective resin compositions for a surface layer in Examples 2 to 46 and Comparative Examples 1 to 12 each were obtained by acetalizing a polyvinyl alcohol resin having an average degree of polymerization of 1700.

(Evaluation)

(1) Sound Insulation

The laminated glass was vibrated with a vibration generator for a dumping test ("Vibration generator G21-005D" produced by Shinken Co., Ltd.). The vibration characteristics obtained thereby were amplified with a mechanical impedance measuring device ("XG-81" produced by Rion), and the vibration spectrum was analyzed with an FFT spectrum analyzer ("FFT analyzer HP3582A" produced by YOKOGAWA Hewlett-Packard, Ltd.).

From the ratio of the loss factor determined thereby and the resonance frequency with the laminated glass, a graph showing the relation between sound frequency (Hz) and sound transmission loss (dB) at 20° C. was plotted, and the minimum sound transmission loss (TL value) around the sound frequency of 2,000 Hz was determined. A higher TL value indicates higher sound insulation. A TL value of 35 dB or higher was evaluated as "o", and a TL value of lower than 35 dB was evaluated as "x". Tables 1 to 5 show the results thereof.

(2) Bubble Formation State (Test Method A and Test Method B)

Five sheets of the laminated glass for a bubble formation test were produced for each laminated interlayer film, and were left to stand in a 50° C. oven for 100 hours. After the standing, the sheets of the laminated glass were observed by eye in a plan view for the presence or absence of bubbles and the sizes of the bubbles (test method A). Another five sheets of the laminated glass for a bubble formation test in test method B were produced for each laminated interlayer film, and were left to stand in a 50° C. oven for 30 days. After the standing, the sheets of the laminated glass were observed by eye in a plan view for the presence or absence of bubbles and the sizes of the bubbles (test method B). From the observation results, the bubble formation state was determined based on the following criteria.

[Criteria of Bubble Formation State]

The bubbles in each of the five sheets of the laminated glass were approximated with an ellipse, and the ellipse area was set to the bubble formation area. The average value of the ellipse areas observed in the respective five sheets of the laminated glass was determined, and the proportion (percentage) of the average value of the ellipses areas (bubble formation areas) to the area of the sheet of the laminated glass (30 cm×15 cm) was determined.

oo: No bubble was observed in all the five sheets of the laminated glass o: Proportion of average value of ellipse area (bubble formation area) was lower than 5%

Δ: Proportion of average value of ellipse area (bubble formation area) was 5% or higher and lower than 10% x: Proportion of average value of ellipse area (bubble formation area) was 10% or higher (3) Penetration Resistance The surface temperature of sheets of the laminated glass (30 cm (length)×30 cm (width)) used for the penetration resistance test was adjusted to 23° C. Subsequently, according to JIS R 3212, a rigid sphere having a mass of 2260 g and a diameter of 82 mm was dropped from a height of 4 m on the center of each of six sheets of the laminated glass. The laminated glass was considered to have passed the test if all the six sheets of the laminated glass prevented the rigid sphere from penetrating therethrough within five seconds after the rigid sphere hit the sheets. The laminated glass was considered to have failed the test if three or less sheets of the laminated glass prevented the rigid sphere from penetrating therethrough within five seconds after the rigid sphere hit the sheets. In the case of four sheets, another six sheets of the laminated glass were tested again on the penetration resistance. In the case of five sheets, another sheet of the laminated glass was tested, and the laminated glass was considered to have passed the test if the other sheet prevented the rigid sphere from penetrating therethrough within five seconds after the rigid sphere hit the sheet. In the same way, a rigid sphere having a mass of 2260 g and a diameter of 82 mm was dropped from heights of 5 m and 6 m on the center of each of six sheets of the laminated glass to evaluate the penetration resistance of the laminated glass.

(4) Measurement of Elastic Modulus G' by Test Method A

An amount of 100 parts by weight of the polyvinyl acetal resin (polyvinyl acetal resin used for the first layer) in the first layer of the interlayer film for a laminated glass in each of the Examples and Comparative Examples was mixed with 60 parts by weight of a plasticizer of triethylene glycol di-2-ethylhexanoate (3GO). The mixture was sufficiently kneaded so that a kneaded product was obtained. The kneaded product was press-molded in a pressing machine to give a resin film A having an average thickness of 0.35 mm. The resin film A was left to stand at 25° C. and a relative humidity of 30% for two hours. After the two hours of standing, the viscoelasticity of the resin film was measured using ARES-G2 produced by TAINSTRUMENTS. Here, a parallel plate of 8 mm in diameter was used as a geometry. The measurement was performed under the conditions of the temperature being decreased from 100° C. to −10° C. at a temperature dropping speed of 3° C./min., the frequency of 1 Hz, and the strain of 1%. The peak temperature of the loss tangent resulting from the measurement was set to the glass transition temperature Tg(° C.). From the measurement results and the glass transition temperature Tg, the elastic modulus $G'(Tg+30)$ at $(Tg+30)°$ C. and the elastic modulus $G'(Tg+80)$ at $(Tg+80)°$ C. were determined. Further, the ratio $(G'(Tg+80)/G'(Tg+30))$ was calculated.

(5) Measurement of Elastic Modulus G' by Test Method B

The interlayer films for a laminated glass of the respective Examples and Comparative Examples were stored in a constant temperature and humidity room (humidity: 30% (±3%), temperature: 23° C.) for one month. Immediately after the end of the one-month storage, the surface layers were separated from the intermediate layer to leave the intermediate layer. In a mold (2 cm in length×2 cm in width×0.76 mm in thickness) arranged between two polyethylene terephthalate (PET) films was placed 1 g of the separated intermediate layer. The resulting product was pre-heated at 150° C. and a pressing pressure of 0 kg/cm² for 10 minutes, and then press-molded at 80 kg/cm² for 15 minutes. The press-molded intermediate layer was put in a hand presser the temperature of which was set to 20° C. in advance, and the layer was pressed at 10 MPa for 10 minutes for cooling. Subsequently, one PET film was removed from the mold arranged between two PET films, and was stored in a constant temperature and humidity room (humidity: 30% (±3%), temperature: 23° C.) for 24 hours. After that, the viscoelasticity of the film was measured with ARES-G2 produced by TAINSTRUMENTS. Here, a parallel plate of 8 mm in diameter was used as a geometry. The measurement was performed under the conditions of the temperature being decreased from 100° C. to −10° C. at a temperature dropping speed of 3° C./min., the frequency of 1 Hz, and the strain of 1%. The peak temperature of the loss tangent resulting from the measurement was set to the glass transition temperature Tg (° C.). From the measurement results and the glass transition temperature Tg, the elastic modulus $G'(Tg+30)$ at $(Tg+30)°$ and the elastic modulus $G'(Tg+80)$ at $(Tg+80)°$ C. was determined. Further, the ratio $(G'(Tg+80)/G'(Tg+30))$ was calculated.

Tables 1 to 5 show the results thereof. In Tables 1 to 5, 3GO and 3GH, which are kinds of plasticizer, respectively represent triethylene glycol di-2-ethylhexanoate and triethylene glycol di-2-ethylbutyrate. Tables 1 to 5 also show the value of the molecular-weight distribution (weight-average molecular weight Mw/number-average molecular weight Mn) of the polyvinyl acetal resin used for each first layer. The number-average molecular weight Mn of the polyvinyl acetal resin used for each first layer was within the range of 50,000 to 500,000. The number-average molecular weight shows the polystyrene-equivalent number-average molecular weight by gel permeation chromatography (GPC) measurement.

TABLE 1

| | | | | Ex. 1 | Ex. 2 | Ex. 3 | Ex. 4 | Ex. 5 | Ex. 6 | Ex. 7 | Ex. 8 |
|---|---|---|---|---|---|---|---|---|---|---|---|
| Formulation of First Layer Resin Composition for | Polyvinyl Butyral Resin | Average degree of polymerization of PVA | | 3050 | 4000 | 4000 | 3070 | 3070 | 3070 | 3070 | 3050 |
| | | Degree of butyralization | mol % | 64 | 64 | 79 | 63.1 | 63.1 | 63.1 | 63.1 | 64.4 |
| | | Degree of | mol % | 12.5 | 12.5 | 0.8 | 12.1 | 12.1 | 12.1 | 12.1 | 12.2 |

TABLE 1-continued

|  |  |  |  |  |  |  |  |  |  |  |
|---|---|---|---|---|---|---|---|---|---|---|
| Intermediate Layer |  | acetylation Hydroxyl content | mol % | 23.5 | 23.5 | 20.2 | 24.8 | 24.8 | 24.8 | 24.8 | 23.4 |
|  |  | Amount | Parts by Weight | 100 | 100 | 100 | 100 | 100 | 100 | 100 | 100 |
|  | Plasticizer | Kind |  | 3GO | 3GO | 3GO | 3GO | 3GO | 3GO | 3GO | 3GO |
|  |  | Amount | Parts by Weight | 60 | 60 | 60 | 70 | 70 | 60 | 60 | 70 |
|  | Molecular-weight Distribution |  |  | 3.0 | 2.9 | 3.2 | 3.0 | 3.0 | 3.0 | 3.0 | 3.2 |
| Formulation of Second and Third Layers Resin Composition for Surface Layer | Polyvinyl Butyral Resin | Degree of butyralization | mol % | 68.8 | 68.8 | 68.8 | 68.5 | 68.5 | 68.5 | 68.5 | 68.3 |
|  |  | Degree of acetylation | mol % | 0.8 | 0.8 | 0.8 | 0.8 | 0.8 | 0.8 | 0.8 | 0.8 |
|  |  | Hydroxyl content | mol % | 30.4 | 30.4 | 30.4 | 30.7 | 30.7 | 30.7 | 30.7 | 30.9 |
|  |  | Amount | Parts by Weight | 100 | 100 | 100 | 100 | 100 | 100 | 100 | 100 |
|  | Plasticizer | Kind |  | 3GO | 3GO | 3GO | 3GO | 3GO | 3GO | 3GO | 3GO |
|  |  | Amount | Parts by Weight | 37.5 | 37.5 | 37.5 | 36.5 | 37.5 | 36.5 | 37.5 | 36.5 |
| Evaluation | (1) Sound insulation: TL value |  |  | ○ | ○ | ○ | ○ | ○ | ○ | ○ | ○ |
|  | (2) Bubble formation state in test method A |  |  | ○ | ○○ | ○○ | ○○ | ○○ | ○○ | ○○ | ○○ |
|  | (2) Bubble formation in test method B |  |  | ○ | ○ | ○ | ○ | ○ | ○ | ○ | ○ |
|  | (3) Penetration resistance |  | 4 m | Passed | Passed | Passed | Passed | Passed | Passed | Passed | Passed |
|  |  |  | 5 m | Passed | Passed | Passed | Passed | Passed | Passed | Passed | Passed |
|  |  |  | 6 m | Passed | Passed | Passed | Passed | Passed | Passed | Passed | Passed |
|  | (4) Test method A: Glass transition temperature (Tg) |  | ° C. | 1.9 | 2.1 | 2.4 | 4.2 | 4.2 | 4.2 | 4.2 | 1.7 |
|  | (4) Test method A: G' (Tg + 30) |  | Pa | 244000 | 276000 | 278000 | 256000 | 256000 | 256000 | 256000 | 250300 |
|  | (4) Test method A: G' (Tg + 80) |  | Pa | 180400 | 231000 | 249500 | 178960 | 178960 | 178960 | 178960 | 183000 |
|  | (4) Test method A: G' (Tg + 80)/G' (Tg + 30) |  |  | 0.74 | 0.84 | 0.90 | 0.70 | 0.70 | 0.70 | 0.70 | 0.73 |
|  | (5) Test method B: Glass transition temperature (Tg) |  | ° C. | −3.1 | −4.9 | −3.6 | −3.3 | −4.8 | −1.8 | −3.8 | −7.3 |
|  | (5) Test method B: G' (Tg + 30) |  | Pa | 234000 | 236000 | 253000 | 221000 | 231000 | 230000 | 220000 | 238300 |
|  | (5) Test method B: G' (Tg + 80) |  | Pa | 168300 | 188000 | 223300 | 147900 | 155700 | 157300 | 151200 | 168300 |
|  | (5) Test method B: G' (Tg + 80)/G' (Tg + 30) |  |  | 0.72 | 0.80 | 0.88 | 0.67 | 0.67 | 0.68 | 0.69 | 0.71 |

|  |  |  |  | Ex. 9 | Ex. 10 | Ex. 11 | Ex. 12 | Ex. 13 | Ex. 14 | Ex. 15 |
|---|---|---|---|---|---|---|---|---|---|---|
| Formulation of First Layer Resin Composition for Intermediate Layer | Polyvinyl Butyral Resin | Average degree of polymerization of PVA |  | 3050 | 3050 | 3050 | 3050 | 3050 | 3050 | 3050 |
|  |  | Degree of butyralization | mol % | 64.4 | 64.4 | 64.4 | 64 | 64 | 77 | 77 |
|  |  | Degree of acetylation | mol % | 12.2 | 12.2 | 12.2 | 12.5 | 12.5 | 0.8 | 0.8 |
|  |  | Hydroxyl content | mol % | 23.4 | 23.4 | 23.4 | 23.5 | 23.5 | 22.2 | 22.2 |
|  |  | Amount | Parts by Weight | 100 | 100 | 100 | 100 | 100 | 100 | 100 |
|  | Plasticizer | Kind |  | 3GO | 3GO | 3GO | 3GO | 3GO | 3GO | 3GO |
|  |  | Amount | Parts by Weight | 70 | 60 | 60 | 65 | 60 | 70 | 55 |
|  | Molecular-weight Distribution |  |  | 3.2 | 3.2 | 3.2 | 3.0 | 3.2 | 3.2 | 3.2 |
| Formulation of Second and Third Layers Resin Composition for Surface Layer | Polyvinyl Butyral Resin | Degree of butyralization | mol % | 68.3 | 68.3 | 68.3 | 68.7 | 68.7 | 68.6 | 68.6 |
|  |  | Degree of acetylation | mol % | 0.8 | 0.8 | 0.8 | 0.8 | 0.8 | 0.8 | 0.8 |
|  |  | Hydroxyl content | mol % | 30.9 | 30.9 | 30.9 | 30.5 | 30.5 | 30.6 | 30.6 |
|  |  | Amount | Parts by Weight | 100 | 100 | 100 | 100 | 100 | 100 | 100 |
|  | Plasticizer | Kind |  | 3GO | 3GO | 3GO | 3GO | 3GO | 3GO | 3GO |
|  |  | Amount | Parts by Weight | 37.5 | 36.5 | 37.5 | 38 | 37.5 | 36.5 | 39 |
| Evaluation | (1) Sound insulation: TL value |  |  | ○ | ○ | ○ | ○ | ○ | ○ | ○ |
|  | (2) Bubble formation state in test method A |  |  | ○○ | ○○ | ○○ | ○○ | ○○ | ○○ | ○○ |
|  | (2) Bubble formation in test method B |  |  | ○ | ○ | ○ | ○ | ○ | ○ | ○ |

TABLE 1-continued

|  |  |  | | | | | | | |
|---|---|---|---|---|---|---|---|---|---|
| (3) Penetration resistance | 4 m | | Passed | Passed | Passed | Passed | Passed | Passed | Passed |
| | 5 m | | Passed | Passed | Passed | Passed | Passed | Passed | Passed |
| | 6 m | | Passed | Passed | Passed | Passed | Passed | Passed | Passed |
| (4) Test method A: Glass transition temperature (Tg) | | °C. | 1.7 | 1.7 | 1.7 | 1.9 | 1.9 | 6.1 | 6.1 |
| (4) Test method A: G' (Tg + 30) | | Pa | 250300 | 250300 | 250300 | 244000 | 244000 | 249000 | 249000 |
| (4) Test method A: G' (Tg + 80) | | Pa | 183000 | 183000 | 183000 | 180400 | 180400 | 181100 | 181100 |
| (4) Test method A: G' (Tg + 80)/G' (Tg + 30) | | | 0.73 | 0.73 | 0.73 | 0.74 | 0.74 | 0.73 | 0.73 |
| (5) Test method B: Glass transition temperature (Tg) | | °C. | −8.3 | −6.3 | −7.9 | −5.1 | −4.1 | −1.9 | −3.9 |
| (5) Test method B: G' (Tg + 30) | | Pa | 222300 | 220300 | 245300 | 235500 | 236500 | 242100 | 243800 |
| (5) Test method B: G' (Tg + 80) | | Pa | 156300 | 155100 | 175700 | 171800 | 171300 | 168800 | 171500 |
| (5) Test method B: G' (Tg + 80)/G' (Tg + 30) | | | 0.70 | 0.70 | 0.72 | 0.73 | 0.72 | 0.70 | 0.70 |

TABLE 2

| | | | | Ex. 16 | Ex. 17 | Ex. 18 | Ex. 19 | Ex. 20 | Ex. 21 | Ex. 22 |
|---|---|---|---|---|---|---|---|---|---|---|
| Formulation of First Layer Resin Composition for Intermediate Layer | Polyvinyl Butyral Resin | Average degree of polymerization of PVA | | 3050 | 3050 | 3070 | 3070 | 4000 | 4000 | 4000 |
| | | Degree of butyralization | mol % | 77.3 | 77.3 | 72.5 | 72.5 | 64.3 | 64.3 | 63.4 |
| | | Degree of acetylation | mol % | 0.8 | 0.8 | 5.5 | 5.5 | 12.5 | 12.5 | 12.5 |
| | | Hydroxyl content | mol % | 21.9 | 21.9 | 22 | 22 | 23.2 | 23.2 | 24.1 |
| | | Amount | Parts by Weight | 100 | 100 | 100 | 100 | 100 | 100 | 100 |
| | Plasticizer | Kind | | 3GO | 3GO | 3GO | 3GO | 3GO | 3GO | 3GO |
| | | Amount | Parts by Weight | 60 | 65 | 65 | 55 | 70 | 60 | 60 |
| | | Molecular-weight Distribution | | 2.7 | 2.7 | 3.2 | 3.2 | 3.0 | 3.0 | 2.5 |
| Formulation of Second and Third Layers Resin Composition for Surface Layer | Polyvinyl Butyral Resin | Degree of butyralization | mol % | 68.7 | 68.7 | 68.2 | 69 | 68.9 | 68.9 | 68.1 |
| | | Degree of acetylation | mol % | 0.8 | 0.8 | 0.8 | 0.8 | 0.8 | 0.8 | 0.8 |
| | | Hydroxyl content | mol % | 30.5 | 30.5 | 31 | 30.2 | 30.3 | 30.3 | 31.1 |
| | | Amount | Parts by Weight | 100 | 100 | 100 | 100 | 100 | 100 | 100 |
| | Plasticizer | Kind | | 3GO | 3GO | 3GO | 3GO | 3GO | 3GO | 3GO |
| | | Amount | Parts by Weight | 37.5 | 37.5 | 37 | 38.5 | 37 | 37.5 | 38 |
| Evaluation | (1) Sound insulation: TL value | | | ○ | ○ | ○ | ○ | ○ | ○ | ○ |
| | (2) Bubble formation state in test method A | | | ○○ | ○○ | ○○ | ○○ | ○○ | ○○ | ○○ |
| | (2) Bubble formation in test method B | | | ○ | ○ | ○ | ○ | ○○ | ○○ | ○○ |
| | (3) Penetration resistance | 4 m | | Passed | Passed | Passed | Passed | Passed | Passed | Passed |
| | | 5 m | | Passed | Passed | Passed | Passed | Passed | Passed | Passed |
| | | 6 m | | Passed | Passed | Passed | Passed | Passed | Passed | Passed |
| | (4) Test method A: Glass transition temperature (Tg) | | °C. | 5.6 | 5.6 | 4.9 | 4.9 | 1.9 | 1.9 | 3.7 |
| | (4) Test method A: G' (Tg + 30) | | Pa | 250000 | 250000 | 250500 | 250500 | 271000 | 271000 | 268800 |
| | (4) Test method A: G' (Tg + 80) | | Pa | 179100 | 179100 | 181200 | 181200 | 225800 | 225800 | 224700 |
| | (4) Test method A: G' (Tg + 80)/G' (Tg + 30) | | | 0.72 | 0.72 | 0.72 | 0.72 | 0.83 | 0.83 | 0.84 |
| | (5) Test method B: Glass transition temperature (Tg) | | °C. | 0.6 | −1.4 | −3.1 | −2.1 | −7.1 | −4.1 | −6.3 |
| | (5) Test method B: G' (Tg + 30) | | Pa | 240000 | 230000 | 225500 | 215500 | 265500 | 245000 | 232800 |
| | (5) Test method B: G' (Tg + 80) | | Pa | 167100 | 162500 | 163100 | 149400 | 214600 | 200500 | 191800 |
| | (5) Test method B: G' (Tg + 80)/G' (Tg + 30) | | | 0.70 | 0.71 | 0.72 | 0.69 | 0.81 | 0.82 | 0.82 |

| | | | | Ex. 23 | Ex. 24 | Ex. 25 | Ex. 26 | Ex. 27 | Ex. 28 | Ex. 29 |
|---|---|---|---|---|---|---|---|---|---|---|
| Formulation of First Layer Resin Composition for | Polyvinyl Butyral Resin | Average degree of polymerization of PVA | | 4000 | 4000 | 4000 | 5000 | 5000 | 5000 | 5000 |
| | | Degree of butyralization | mol % | 63.4 | 79 | 79 | 63.9 | 63.9 | 77.1 | 77.1 |
| | | Degree of acetylation | mol % | 12.5 | 0.8 | 0.8 | 12.5 | 12.5 | 0.8 | 0.8 |
| | | Hydroxyl content | mol % | 24.1 | 20.2 | 20.2 | 23.6 | 23.6 | 22.1 | 22.1 |

TABLE 2-continued

| | | | | | | | | | | |
|---|---|---|---|---|---|---|---|---|---|---|
| Intermediate Layer | | Amount | Parts by Weight | 100 | 100 | 100 | 100 | 100 | 100 | 100 |
| | Plasticizer | Kind | | 3GO | 3GO | 3GO | 3GO | 3GO | 3GO | 3GO |
| | | Amount | Parts by Weight | 70 | 70 | 60 | 70 | 60 | 70 | 60 |
| Formulation of Second and Third Layers Resin Composition for Surface Layer | Polyvinyl Butyral Resin | Molecular-weight Distribution | | 2.5 | 3.2 | 3.2 | 2.5 | 2.5 | 2.5 | 2.5 |
| | | Degree of butyralization | mol % | 68.1 | 69.1 | 69.1 | 68.5 | 68.5 | 68.7 | 68.7 |
| | | Degree of acetylation | mol % | 0.8 | 0.8 | 0.8 | 0.8 | 0.8 | 0.8 | 0.8 |
| | | Hydroxyl content | mol % | 31.1 | 30.1 | 30.1 | 30.7 | 30.7 | 30.5 | 30.5 |
| | | Amount | Parts by Weight | 100 | 100 | 100 | 100 | 100 | 100 | 100 |
| | Plasticizer | Kind | | 3GO | 3GO | 3GO | 3GO | 3GO | 3GO | 3GO |
| | | Amount | Parts by Weight | 36.5 | 36.5 | 38 | 36 | 37.5 | 36.5 | 39 |
| Evaluation | (1) Sound insulation: TL value | | | ○ | ○ | ○ | ○ | ○ | ○ | ○ |
| | (2) Bubble formation state in test method A | | | ○○ | ○○ | ○○ | ○○ | ○○ | ○○ | ○○ |
| | (2) Bubble formation in test method B | | | ○○ | ○○ | ○○ | ○○ | ○○ | ○○ | ○○ |
| | (3) Penetration resistance | | 4 m | Passed | Passed | Passed | Passed | Passed | Passed | Passed |
| | | | 5 m | Passed | Passed | Passed | Passed | Passed | Passed | Passed |
| | | | 6 m | Passed | Passed | Passed | Passed | Passed | Passed | Passed |
| | (4) Test method A: Glass transition temperature (Tg) | | °C. | 3.7 | 2.4 | 2.4 | 3.3 | 3.3 | 3.9 | 3.9 |
| | (4) Test method A: G' (Tg + 30) | | Pa | 268800 | 278000 | 278000 | 276500 | 276500 | 277800 | 277800 |
| | (4) Test method A: G' (Tg + 80) | | Pa | 224700 | 249500 | 249500 | 244400 | 244400 | 253200 | 253200 |
| | (4) Test method A: G' (Tg + 80)/G' (Tg + 30) | | | 0.84 | 0.90 | 0.90 | 0.88 | 0.88 | 0.91 | 0.91 |
| | (5) Test method B: Glass transition temperature (Tg) | | °C. | −5.3 | −5.1 | −7.6 | −3.7 | −6.3 | −2.1 | −6.1 |
| | (5) Test method B: G' (Tg + 30) | | Pa | 256800 | 250000 | 268400 | 271500 | 268000 | 270300 | 260900 |
| | (5) Test method B: G' (Tg + 80) | | Pa | 208200 | 217400 | 233600 | 235900 | 234200 | 242300 | 230000 |
| | (5) Test method B: G' (Tg + 80)/G' (Tg + 30) | | | 0.81 | 0.87 | 0.87 | 0.87 | 0.87 | 0.90 | 0.88 |

TABLE 3

| | | | | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|---|
| Formulation of First Layer Resin Composition for Intermediate Layer | Polyvinyl Butyral Resin | Average degree of polymerization of PVA | | 2300 | 1700 | 2300 | 2300 | 1700 | 2500 | 2500 |
| | | Degree of butyralization | mol % | 64 | 79 | 64 | 64 | 79 | 79 | 79 |
| | | Degree of acetylation | mol % | 12.5 | 0.8 | 12.5 | 12.5 | 0.8 | 0.8 | 0.8 |
| | | Hydroxyl content | mol % | 23.5 | 20.2 | 23.5 | 23.5 | 20.2 | 20.2 | 20.2 |
| | | Amount | Parts by Weight | 100 | 100 | 100 | 100 | 100 | 100 | 100 |
| | Plasticizer | Kind | | 3GO | 3GO | 3GO | 3GO | 3GO | 3GO | 3GO |
| | | Amount | Parts by Weight | 60 | 60 | 70 | 60 | 70 | 70 | 60 |
| Formulation of Second and Third Layers Resin Composition for Surface Layer | Polyvinyl Butyral Resin | Molecular-weight Distribution | | 3.5 | 3.6 | 3.5 | 3.5 | 3.6 | 3.6 | 3.6 |
| | | Degree of butyralization | mol % | 68.8 | 68.8 | 68.4 | 68.4 | 68.8 | 68.8 | 68.8 |
| | | Degree of acetylation | mol % | 0.8 | 0.8 | 0.8 | 0.8 | 0.8 | 0.8 | 0.8 |
| | | Hydroxyl content | mol % | 30.4 | 30.4 | 30.8 | 30.8 | 30.4 | 30.4 | 30.4 |
| | | Amount | Parts by Weight | 100 | 100 | 100 | 100 | 100 | 100 | 100 |
| | Plasticizer | Kind | | 3GO | 3GO | 3GO | 3GO | 3GO | 3GO | 3GO |
| | | Amount | Parts by Weight | 37.5 | 37.5 | 36.5 | 37.5 | 36.5 | 36.5 | 37.5 |
| Evaluation | (1) Sound insulation: TL value | | | ○ | ○ | ○ | ○ | ○ | ○ | ○ |
| | (2) Bubble formation state in test method A | | | X | X | X | X | X | X | X |
| | (2) Bubble formation in test method B | | | X | X | X | X | X | X | X |
| | (3) Penetration resistance | | 4 m | Passed | Passed | Passed | Passed | Passed | Passed | Passed |
| | | | 5 m | Passed | Passed | Passed | Passed | Passed | Passed | Passed |
| | | | 6 m | Passed | Passed | Passed | Passed | Passed | Passed | Passed |
| | (4) Test method A: Glass transition temperature (Tg) | | °C. | 1.8 | 2.4 | 1.8 | 1.8 | 2.4 | 2.4 | 2.4 |
| | (4) Test method A: G' (Tg + 30) | | Pa | 236500 | 245000 | 236500 | 236500 | 245000 | 221500 | 221500 |
| | (4) Test method A: G' (Tg + 80) | | Pa | 142000 | 105000 | 142000 | 142000 | 105000 | 137900 | 137900 |
| | (4) Test method A: G' (Tg + 80)/G' (Tg + 30) | | | 0.60 | 0.43 | 0.60 | 0.60 | 0.43 | 0.62 | 0.62 |
| | (5) Test method B: Glass transition temperature (Tg) | | °C. | −3.2 | −4.6 | −4.2 | −5.7 | −6.6 | −3.6 | −5.6 |
| | (5) Test method B: G' (Tg + 30) | | Pa | 226500 | 225000 | 211500 | 201500 | 220000 | 195500 | 205500 |

TABLE 3-continued

|  |  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| (5) Test method B: G' (Tg + 80) | Pa | 131500 | 94200 | 127000 | 114900 | 88800 | 118800 | 125500 |
| (5) Test method B: G' (Tg + 80)/ G' (Tg + 30) |  | 0.58 | 0.42 | 0.60 | 0.57 | 0.40 | 0.61 | 0.61 |

TABLE 4

|  |  |  |  | Ex. 30 | Ex. 31 | Ex. 32 | Ex. 33 | Ex. 34 | Ex. 35 | Ex. 36 | Ex. 37 |
|---|---|---|---|---|---|---|---|---|---|---|---|
| Formulation of First Layer Resin Composition for Intermediate Layer | Polyvinyl Butyral Resin | Average degree of polymerization of PVA |  | 3050 | 3050 | 3050 | 4000 | 2310 | 1715 | 3020 | 1800 |
|  |  | Degree of butyralization | mol % | 64.4 | 73.4 | 78 | 64.3 | 64.4 | 78 | 64.3 | 64.9 |
|  |  | Degree of acetylation | mol % | 12.2 | 5.6 | 1.2 | 12.5 | 12.2 | 0.8 | 13.2 | 12.6 |
|  |  | Hydroxyl content | mol % | 23.4 | 21 | 20.8 | 23.2 | 23.4 | 21.2 | 22.5 | 21.3 |
|  |  | Proportion of carboxyl acid modification | mol % | — | — | — | — | — | — | — | 1.2 |
|  |  | Amount | Parts by Weight | 100 | 100 | 100 | 100 | 100 | 100 | 100 | 100 |
|  | Plasticizer | Kind |  | 3GH | 3GH | 3GH | 3GH | 3GO | 3GO | 3GO | 3GO |
|  |  | Amount | Parts by Weight | 60 | 60 | 60 | 60 | 60 | 60 | 60 | 60 |
|  |  | Molecular-weight Distribution |  | 3.2 | 3.1 | 3.2 | 3.2 | 3.2 | 3.1 | 2.8 | 3.2 |
|  | Sodium Tetraborate Na | Amount | Parts by Weight | — | — | — | — | 0.12 | 0.12 | 0.12 | — |
| Formulation of Second and Third Layers Resin Composition for Surface Layer | Polyvinyl Butyral Resin | Degree of butyralization | mol % | 68.3 | 68.3 | 68.3 | 68.3 | 68.3 | 68.3 | 68.3 | 68.3 |
|  |  | Degree of acetylation | mol % | 0.8 | 0.8 | 0.8 | 0.8 | 0.8 | 0.8 | 0.8 | 0.8 |
|  |  | Hydroxyl content | mol % | 30.9 | 30.9 | 30.9 | 30.9 | 30.9 | 30.9 | 30.9 | 30.9 |
|  |  | Amount | Parts by Weight | 100 | 100 | 100 | 100 | 100 | 100 | 100 | 100 |
|  | Plasticizer | Kind |  | 3GH | 3GH | 3GH | 3GH | 3GO | 3GO | 3GO | 3GO |
|  |  | Amount | Parts by Weight | 37.5 | 37.5 | 37.5 | 37.5 | 37.5 | 37.5 | 37.5 | 37.5 |
| Evaluation | (1) Sound insulation: TL value |  |  | ◯ | ◯ | ◯ | ◯ | ◯ | ◯ | ◯ | ◯ |
|  | (2) Bubble formation state in test method A |  |  | ◯◯ | ◯◯ | ◯◯ | ◯◯ | ◯◯ | ◯◯ | ◯◯ | ◯◯ |
|  | (2) Bubble formation in test method B |  |  | ◯ | ◯ | ◯ | ◯ | ◯ | ◯ | ◯ | ◯ |
|  | (3) Penetration resistance |  | 4 m | Passed | Passed | Passed | Passed | Passed | Passed | Passed | Passed |
|  |  |  | 5 m | Passed | Passed | Passed | Passed | Passed | Passed | Passed | Passed |
|  |  |  | 6 m | Passed | Passed | Passed | Passed | Passed | Passed | Passed | Passed |
|  | (4) Test method A: Glass transition temperature (Tg) |  | ° C. | 2.1 | 5.3 | 6.3 | 2.3 | 0.1 | 2.4 | 2.0 | 1.2 |
|  | (4) Test method A: G' (Tg + 30) |  | Pa | 254200 | 253200 | 243600 | 256200 | 283605 | 279855 | 233100 | 242400 |
|  | (4) Test method A: G' (Tg + 80) |  | Pa | 186600 | 184500 | 175200 | 215000 | 201653 | 190145 | 216000 | 169100 |
|  | (4) Test method A: G' (Tg + 80)/ G' (Tg + 30) |  |  | 0.73 | 0.73 | 0.72 | 0.84 | 0.71 | 0.68 | 0.93 | 0.70 |
|  | (5) Test method B: Glass transition temperature (Tg) |  | ° C. | −1.7 | −1.5 | 1.2 | −1.6 | −8.9 | −3.6 | −6.0 | −7.8 |
|  | (5) Test method B: G' (Tg + 30) |  | Pa | 244200 | 233200 | 218600 | 221200 | 258605 | 253855 | 197100 | 230400 |
|  | (5) Test method B: G' (Tg + 80) |  | Pa | 174400 | 167600 | 157200 | 179000 | 177400 | 168700 | 180300 | 155000 |
|  | (5) Test method B: G' (Tg + 80)/ G' (Tg + 30) |  |  | 0.71 | 0.72 | 0.72 | 0.81 | 0.69 | 0.66 | 0.91 | 0.67 |

TABLE 5

|  |  |  |  | Ex. 38 | Ex. 39 | Ex. 40 | Ex. 41 | Ex. 42 | Ex. 43 | Ex. 44 |
|---|---|---|---|---|---|---|---|---|---|---|
| Formulation of First Layer Resin Composition for | Polyvinyl Butyral Resin | Average degree of polymerization of PVA |  | 3050 | 3050 | 3080 | 3020 | 3040 | 3200 | 3400 |
|  |  | Degree of butyralization | mol % | 64.4 | 64.1 | 64.8 | 65.1 | 70 | 59.2 | 54.1 |
|  |  | Degree of acetylation | mol % | 12.2 | 12.7 | 11.7 | 12.1 | 8.5 | 19 | 23 |
|  |  | Hydroxyl content | mol % | 23.4 | 23.2 | 23.5 | 22.8 | 21.5 | 21.8 | 22.9 |

TABLE 5-continued

| | | | | | | | | | | |
|---|---|---|---|---|---|---|---|---|---|---|
| Intermediate Layer | | Amount | Parts by Weight | 100 | 100 | 100 | 100 | 100 | 100 | 100 |
| | Plasticizer | Kind | | 3GO | 3GO | 3GO | 3GO | 3GO | 3GO | 3GO |
| | | Amount | Parts by Weight | 60 | 60 | 60 | 60 | 60 | 60 | 60 |
| | | Molecular-weight Distribution | | 1.2 | 4.3 | 5.4 | 6.4 | 1.5 | 3.8 | 4.6 |
| | Sodium Tetraborate Na | Amount | Parts by Weight | — | — | — | — | — | — | — |
| Formulation of Second and Third Layers Resin Composition for Surface Layer | Polyvinyl Butyral Resin | Degree of butyralization | mol % | 68.3 | 68.3 | 68.3 | 68.3 | 68.3 | 68.3 | 68.3 |
| | | Degree of acetylation | mol % | 0.8 | 0.8 | 0.8 | 0.8 | 0.8 | 0.8 | 0.8 |
| | | Hydroxyl content | mol % | 30.9 | 30.9 | 30.9 | 30.9 | 30.9 | 30.9 | 30.9 |
| | | Amount | Parts by Weight | 101 | 102 | 103 | 104 | 105 | 106 | 107 |
| | Plasticizer | Kind | | 3GO | 3GO | 3GO | 3GO | 3GO | 3GO | 3GO |
| | | Amount | Parts by Weight | 37.5 | 37.5 | 37.5 | 37.5 | 37.5 | 37.5 | 37.5 |
| Evaluation | (1) Sound insulation: TL value | | | ◯ | ◯ | ◯ | ◯ | ◯ | ◯ | ◯ |
| | (2) Bubble formation state in test method A | | | ◯◯ | ◯◯ | ◯◯ | ◯◯ | ◯◯ | ◯◯ | ◯◯ |
| | (2) Bubble formation in test method B | | | ◯ | ◯ | ◯ | ◯ | ◯ | ◯ | ◯ |
| | (3) Penetration resistance | | 4 m | Passed | Passed | Passed | Passed | Passed | Passed | Passed |
| | | | 5 m | Passed | Passed | Passed | Passed | Passed | Passed | Passed |
| | | | 6 m | Passed | Passed | Passed | Passed | Passed | Passed | Passed |
| | (4) Test method A: Glass transition temperature (Tg) | | °C. | 1.3 | 1.2 | 1.5 | 0.7 | −0.3 | −0.1 | 1.1 |
| | (4) Test method A: G' (Tg + 30) | | Pa | 245600 | 239800 | 254100 | 239900 | 248800 | 249700 | 256900 |
| | (4) Test method A: G' (Tg + 80) | | Pa | 176832 | 170258 | 190575 | 165531 | 166696 | 169796 | 179830 |
| | (4) Test method A: G' (Tg + 80)/ G' (Tg + 30) | | | 0.72 | 0.71 | 0.75 | 0.69 | 0.67 | 0.68 | 0.70 |
| | (5) Test method B: Glass transition temperature (Tg) | | °C. | −3.0 | −2.5 | −2.0 | −2.8 | −3.8 | −3.6 | −2.4 |
| | (5) Test method B: G' (Tg + 30) | | Pa | 233600 | 224800 | 238300 | 227300 | 226300 | 228700 | 225900 |
| | (5) Test method B: G' (Tg + 80) | | Pa | 165900 | 155100 | 174000 | 150000 | 147100 | 148700 | 153600 |
| | (5) Test method B: G' (Tg + 80)/ G' (Tg + 30) | | | 0.71 | 0.69 | 0.73 | 0.66 | 0.65 | 0.65 | 0.68 |

| | | | | Ex. 45 | Ex. 46 | Comp. Ex. 8 | Comp. Ex. 9 | Comp. Ex. 10 | Comp. Ex. 11 | Comp. Ex. 12 |
|---|---|---|---|---|---|---|---|---|---|---|
| Formulation of First Layer Resin Composition for Intermediate Layer | Polyvinyl Butyral Resin | Average degree of polymerization of PVA | | 3480 | 3150 | 2000 | 2300 | 2300 | 2300 | 2500 |
| | | Degree of butyralization | mol % | 71 | 74.5 | 64 | 64.1 | 72 | 64.2 | 79 |
| | | Degree of acetylation | mol % | 7.5 | 3.1 | 12.5 | 12.3 | 5.4 | 12.5 | 0.8 |
| | | Hydroxyl content | mol % | 21.5 | 22.4 | 23.5 | 23.6 | 22.6 | 23.3 | 20.2 |
| | | Amount | Parts by Weight | 100 | 100 | 100 | 100 | 100 | 100 | 100 |
| | Plasticizer | Kind | | 3GO | 3GO | 3GO | 3GO | 3GO | 3GH | 3GH |
| | | Amount | Parts by Weight | 60 | 60 | 60 | 60 | 60 | 60 | 60 |
| | | Molecular-weight Distribution | | 2.5 | 6.3 | 2.7 | 2.8 | 2.8 | 3.6 | 3.6 |
| | Sodium Tetraborate Na | Amount | Parts by Weight | — | — | — | — | — | — | — |
| Formulation of Second and Third Layers Resin Composition for Surface Layer | Polyvinyl Butyral Resin | Degree of butyralization | mol % | 68.3 | 68.3 | 68.4 | 68.4 | 68.4 | 68.8 | 68.8 |
| | | Degree of acetylation | mol % | 0.8 | 0.8 | 0.8 | 0.8 | 0.8 | 0.8 | 0.8 |
| | | Hydroxyl content | mol % | 30.9 | 30.9 | 30.8 | 30.8 | 30.8 | 30.4 | 30.4 |
| | | Amount | Parts by Weight | 108 | 109 | 100 | 100 | 100 | 100 | 100 |
| | Plasticizer | Kind | | 3GO | 3GO | 3GO | 3GO | 3GO | 3GH | 3GH |
| | | Amount | Parts by Weight | 37.5 | 37.5 | 36.5 | 37.5 | 37.5 | 37.5 | 37.5 |
| Evaluation | (1) Sound insulation: TL value | | | ◯ | ◯ | ◯ | ◯ | ◯ | ◯ | ◯ |
| | (2) Bubble formation state in test method A | | | ◯◯ | ◯◯ | X | X | X | X | X |
| | (2) Bubble formation in test method B | | | ◯ | ◯ | X | X | X | X | X |
| | (3) Penetration resistance | | 4 m | Passed | Passed | Passed | Passed | Passed | Passed | Passed |
| | | | 5 m | Passed | Passed | Passed | Passed | Passed | Passed | Passed |
| | | | 6 m | Passed | Passed | Passed | Passed | Passed | Passed | Passed |
| | (4) Test method A: Glass transition temperature (Tg) | | °C. | 0.3 | 0.3 | 1.8 | 1.8 | 1.8 | 1.8 | 1.3 |
| | (4) Test method A: G' (Tg + 30) | | Pa | 247500 | 246300 | 236500 | 241000 | 243200 | 222400 | 225600 |
| | (4) Test method A: G' (Tg + 80) | | Pa | 173250 | 172410 | 142000 | 147000 | 145200 | 135000 | 145200 |
| | (4) Test method A: G' (Tg + 80)/ G' (Tg + 30) | | | 0.70 | 0.70 | 0.60 | 0.61 | 0.60 | 0.61 | 0.64 |

TABLE 5-continued

| | | | | | | | |
|---|---|---|---|---|---|---|---|
| (5) Test method B: Glass transition temperature (Tg) | °C. | −3.2 | −3.2 | −8.2 | −6.2 | −7.8 | −4.2 | −5.7 |
| (5) Test method B: G' (Tg + 30) | Pa | 230500 | 230300 | 208500 | 213000 | 238200 | 213900 | 218100 |
| (5) Test method B: G' (Tg + 80) | Pa | 156700 | 156600 | 119400 | 124200 | 138600 | 127700 | 137100 |
| (5) Test method B: G' (Tg + 80)/ G' (Tg + 30) | | 0.68 | 0.68 | 0.57 | 0.58 | 0.58 | 0.60 | 0.63 |

Tables 1 to 5 show the ratio (G'(Tg+80)/G'(Tg+30)) of the resin film B determined by measuring the elastic modulus G' of the resin film B (first layer) containing the polyvinyl acetal resin and the plasticizer which constituted the first layer of the interlayer film for a laminated glass in each of the Examples and Comparative Examples according to the formulations shown in Tables 1 to 5, after the plasticizer was migrated between the layers of the laminated interlayer film. The ratio (G'(Tg+80)/G'(Tg+30)) of the resin film B was almost the same as the ratio (G'(Tg+80)/G'(Tg+30)) of the resin film A that contained 100 parts by weight of the polyvinyl acetal resin in the first layer and 60 parts by weight of 3Go.

EXPLANATION OF SYMBOLS

1 Interlayer film
2 First layer
2a One face
2b The other face
3 Second layer
3a Outer surface
4 Third layer
4a Outer surface
11 Laminated glass
12 First laminated-glass component
13 Second laminated-glass component

The invention claimed is:

1. An interlayer film for a laminated glass, comprising
a first layer that contains a polyvinyl acetal resin and a plasticizer, and
a second layer that contains a polyvinyl acetal resin and a plasticizer and is laminated on one face of the first layer,
wherein in the case of measuring viscoelasticity of a resin film formed from the first layer, the resin film, having a glass transition temperature of Tg(° C.), has an elastic modulus of G'(Tg+80) at (Tg+80)° C. and an elastic modulus of G'(Tg+30) at (Tg+30)° C., and provides a ratio (G'(Tg+80)/G'(Tg+30)) of 0.65 or higher,
an amount of the plasticizer for each 100 parts by weight of the polyvinyl acetal resin in the first layer is larger than an amount of the plasticizer for each 100 parts by weight of the polyvinyl acetal resin in the second layer, and
the hydroxyl content of the polyvinyl acetal resin in the first layer is lower than the hydroxyl content of the polyvinyl acetal resin in the second layer.

2. An interlayer film for a laminated glass, comprising
a first layer that contains a polyvinyl acetal resin and a plasticizer, and
a second layer that contains a polyvinyl acetal resin and a plasticizer and is laminated on one face of the first layer,
wherein in the case of measuring viscoelasticity of a resin film formed with 100 parts by weight of the polyvinyl acetal resin contained in the first layer and 60 parts by weight of a plasticizer of triethylene glycol di-2-ethylhexanoate (3GO), the resin film, having a glass transition temperature of Tg(° C.), has an elastic modulus of G'(Tg+80) at (Tg+80)° C. and an elastic modulus of G'(Tg+30) at (Tg+30)° C., and provides a ratio (G'(Tg+80)/G'(Tg+30)) of 0.65 or higher,
an amount of the plasticizer for each 100 parts by weight of the polyvinyl acetal resin in the first layer is larger than an amount of the plasticizer for each 100 parts by weight of the polyvinyl acetal resin in the second layer, and
the hydroxyl content of the polyvinyl acetal resin in the first layer is lower than the hydroxyl content of the polyvinyl acetal resin in the second layer.

3. The interlayer film for a laminated glass according to claim 1 or 2,
wherein the elastic modulus G'(Tg+30) is 200,000 Pa or higher.

4. The interlayer film for a laminated glass according to claim 1 or 2,
wherein the polyvinyl acetal resin in the first layer has a degree of acetylation of 8 mol % or higher.

5. The interlayer film for a laminated glass according to claim 1 or 2,
wherein the polyvinyl acetal resin in the first layer has a degree of acetylation of lower than 8 mol % and a degree of acetalization of 68 mol % or higher.

6. The interlayer film for a laminated glass according to claim 1 or 2,
wherein the polyvinyl acetal resin in the first layer has a molecular-weight distribution (weight-average molecular weight Mw/number-average molecular weight Mn) of 6.5 or lower.

7. The interlayer film for a laminated glass according to claim 6,
wherein the polyvinyl acetal resin in the first layer has a molecular-weight distribution (weight-average molecular weight Mw/number-average molecular weight Mn) of 2.5 to 3.2.

8. The interlayer film for a laminated glass according to claim 1 or 2,
wherein the first layer has 50 parts by weight or more of the plasticizer for each 100 parts by weight of the polyvinyl acetal resin.

9. The interlayer film for a laminated glass according to claim 8,
wherein the first layer has 55 parts by weight or more of the plasticizer for each 100 parts by weight of the polyvinyl acetal resin.

10. The interlayer film for a laminated glass according to claim 9,
wherein the polyvinyl acetal resin in the first layer contains 30 mol % or lower of a hydroxyl group.

11. The interlayer film for a laminated glass according to claim 1 or 2, further comprising
a third layer that contains a polyvinyl acetal resin and a plasticizer and is laminated on the other face of the first layer.

12. The interlayer film for a laminated glass according to claim 11,
wherein the polyvinyl acetal resin in the first layer has a degree of acetylation of 8 mol % or higher.

13. The interlayer film for a laminated glass according to claim 12,
wherein an amount of the plasticizer for each 100 parts by weight of the polyvinyl acetal resin in the first layer is larger than an amount of the plasticizer for each 100 parts by weight of the polyvinyl acetal resin in each of the second layer and the third layer.

14. The interlayer film for a laminated glass according to claim 13,
wherein the polyvinyl acetal resin in each of the first layer, the second layer and the third layer includes a polyvinyl butyral resin, and
the plasticizer in each of the first layer, the second layer and the third layer includes at least one compound selected from the group consisting of triethylene glycol di-2-ethylbutyrate, triethylene glycol di-2-ethylhexanoate, and triethylene glycol di-n-heptanoate.

15. The interlayer film for a laminated glass according to claim 11,
wherein the polyvinyl acetal resin in the first layer has a degree of acetylation of lower than 8 mol % and a degree of acetalization of 68 mol % or higher.

16. The interlayer film for a laminated glass according to claim 1 or 2,
wherein the polyvinyl acetal resin in the first layer includes a carboxylic acid-modified polyvinyl acetal resin.

17. The interlayer film for a laminated glass according to claim 1 or 2,
wherein the first layer contains a compound that has a boron atom.

18. The interlayer film for a laminated glass according to claim 17,
wherein the compound that has a boron atom includes at least one compound selected from the group consisting of sodium tetraborate, potassium tetraborate, and boric acid.

19. A laminated glass comprising
first laminated-glass component and second laminated-glass component, and
an interlayer film sandwiched between the first laminated-glass component and the second laminated-glass component,
wherein the interlayer film is the interlayer film for a laminated glass according to claim 1 or 2.

* * * * *